United States Patent
Shah

(10) Patent No.: US 12,420,493 B2
(45) Date of Patent: Sep. 23, 2025

(54) INDUCTION HEAT-SEAL CLOSURE LINER WITH RESTRICTED PRODUCT ORIFICE

(71) Applicant: Tekni-Plex, Inc., Wayne, PA (US)

(72) Inventor: Munish Shah, Sylvania, OH (US)

(73) Assignee: Tekni-Plex, Inc., Wayne, PA (US)

( * ) Notice: Subject to any disclaimer, the term of this patent is extended or adjusted under 35 U.S.C. 154(b) by 114 days.

(21) Appl. No.: 18/214,544

(22) Filed: Jun. 27, 2023

(65) Prior Publication Data

US 2024/0001623 A1    Jan. 4, 2024

Related U.S. Application Data

(60) Provisional application No. 63/357,369, filed on Jun. 30, 2022.

(51) Int. Cl.
| | | |
|---|---|---|
| *B65D 51/20* | (2006.01) | |
| *B29C 65/36* | (2006.01) | |
| *B65D 53/02* | (2006.01) | |
| *B65D 53/04* | (2006.01) | |

(52) U.S. Cl.
CPC ............ *B29C 65/368* (2013.01); *B65D 51/20* (2013.01); *B65D 53/02* (2013.01); *B65D 53/04* (2013.01); *B65D 2251/0028* (2013.01); *B65D 2251/0062* (2013.01); *B65D 2251/0093* (2013.01)

(58) Field of Classification Search
CPC ........ B65D 53/06; B65D 53/04; B65D 53/02; B65D 51/20; B65D 41/0478; B65D 41/045; B65D 65/40; B65D 41/04; B32B 15/08; B32B 2435/02; B32B 7/12
USPC ...................................................... 220/378
See application file for complete search history.

(56) References Cited

U.S. PATENT DOCUMENTS

| | | |
|---|---|---|
| 4,013,188 A | 3/1977 | Ray |
| 5,513,731 A | 5/1996 | Matsuoka |
| 5,513,781 A | 5/1996 | Ulrich et al. |
| 5,730,306 A * | 3/1998 | Costa .................... B65D 53/04 |
| | | 215/261 |
| 6,378,715 B1 | 4/2002 | Finkelstein et al. |
| 7,740,730 B2 | 6/2010 | Schedl et al. |
| 8,991,608 B2 | 3/2015 | Zuser et al. |

(Continued)

FOREIGN PATENT DOCUMENTS

| | | |
|---|---|---|
| EP | 0812781 A1 | 12/1997 |
| EP | 1582477 A1 | 5/2005 |
| EP | 1873078 A1 | 1/2008 |

OTHER PUBLICATIONS

International Search Report and Written Opinion in related international application No. PCT/US2023/026273 issued on Oct. 2, 2023.

(Continued)

*Primary Examiner* — Anthony D Stashick
*Assistant Examiner* — Raven Collins
(74) *Attorney, Agent, or Firm* — POLSINELLI PC

(57) ABSTRACT

An induction heat-sealed closure liner assembly having a restricted product orifice that is smaller than the mouth of the container to which the assembly is attached, to allow restricted dispensing of product through the orifice. The closure assembly is designed for storing and dispensing a product, such as a solid, liquid or paste product, and includes primary and secondary liner components that are positionable within a retainer portion of a cap to form the closure liner assembly.

19 Claims, 16 Drawing Sheets

(56) References Cited

U.S. PATENT DOCUMENTS

| | | |
|---|---|---|
| 9,132,947 B2 | 9/2015 | Wiening |
| 9,457,940 B2 | 10/2016 | Grell |
| 9,469,456 B2 | 10/2016 | Grell |
| 9,511,924 B1 | 12/2016 | Crawford |
| 10,264,903 B2 | 4/2019 | Fisch |
| 10,384,840 B2 | 8/2019 | Fisch |
| 10,569,937 B2 | 2/2020 | Giraud et al. |
| 10,882,666 B2 | 1/2021 | Giraud et al. |
| 10,882,673 B2 | 1/2021 | Shah et al. |
| 10,934,065 B2 | 3/2021 | Fisch |
| 10,988,290 B2 | 4/2021 | Danks et al. |
| 2003/0054534 A1 | 3/2003 | Outtrup et al. |
| 2003/0168423 A1* | 9/2003 | Williams ............... B32B 27/08 |
| | | 222/153.1 |
| 2006/0054584 A1 | 3/2006 | Jackman |
| 2012/0193267 A1 | 8/2012 | Balthes |
| 2012/0312818 A1* | 12/2012 | Ekkert ................ B65D 41/045 |
| | | 220/258.2 |
| 2018/0134461 A1* | 5/2018 | Fisch ................. B65D 41/0435 |
| 2020/0277114 A1* | 9/2020 | Shi ......................... B32B 15/08 |
| 2021/0179326 A1 | 6/2021 | Fisch |
| 2023/0226797 A1 | 7/2023 | Thorstensen-Woll |

OTHER PUBLICATIONS

International Preliminary Report on Patentability in related international application No. PCT/US2023/026273 issued on Jul. 1, 2024.

Brazilian Office Action dated May 9, 2025 issued in Patent Application No. BR112024015495-5 with English translation (10 pages).

\* cited by examiner

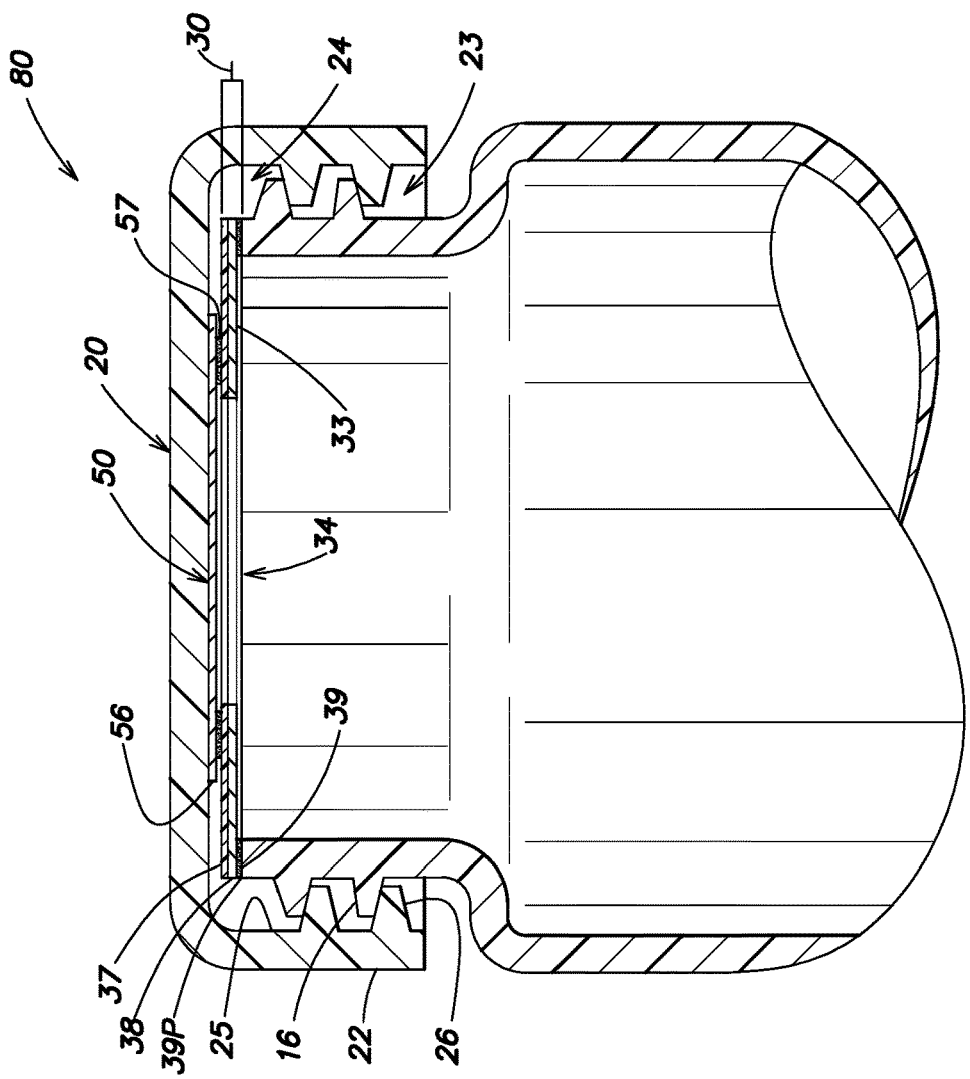
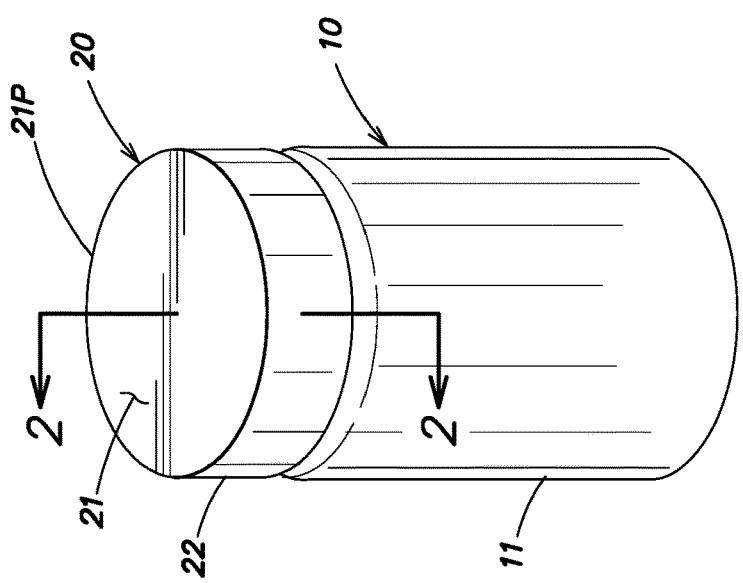

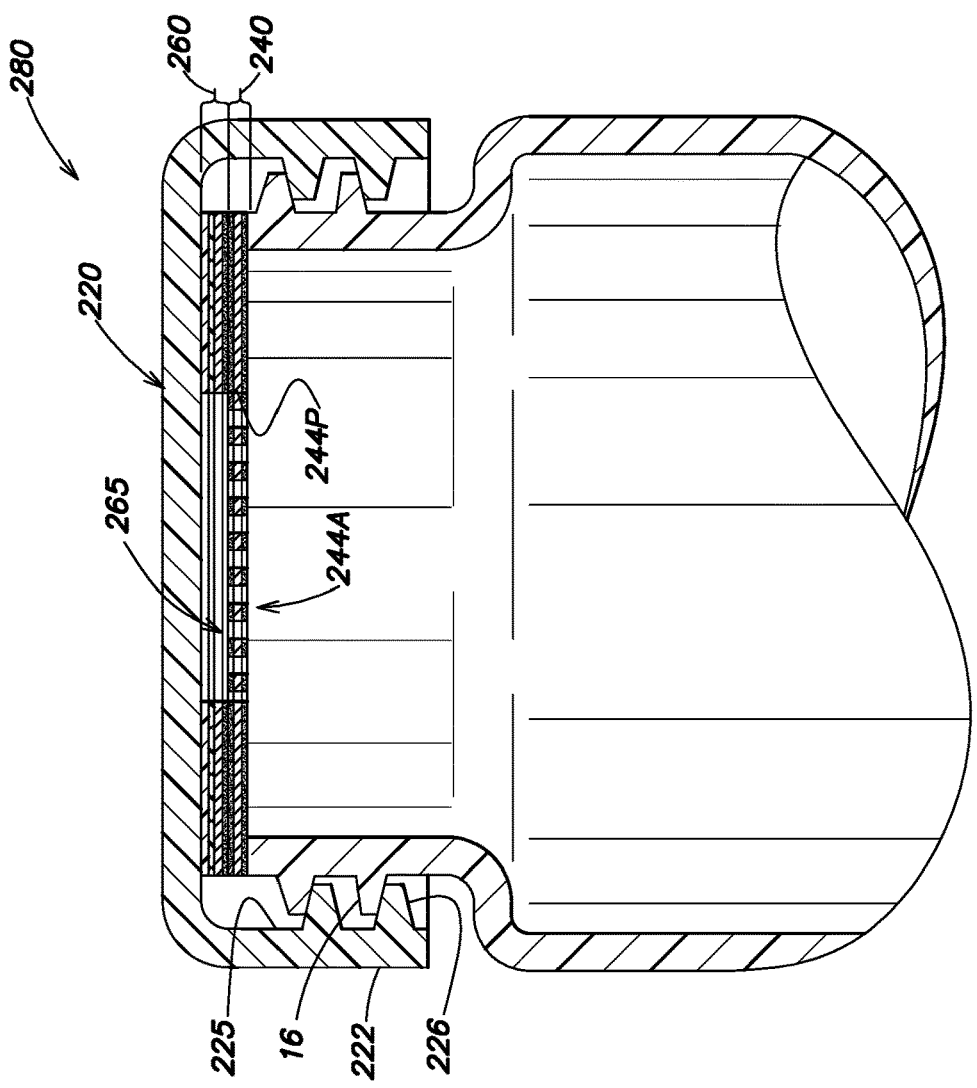
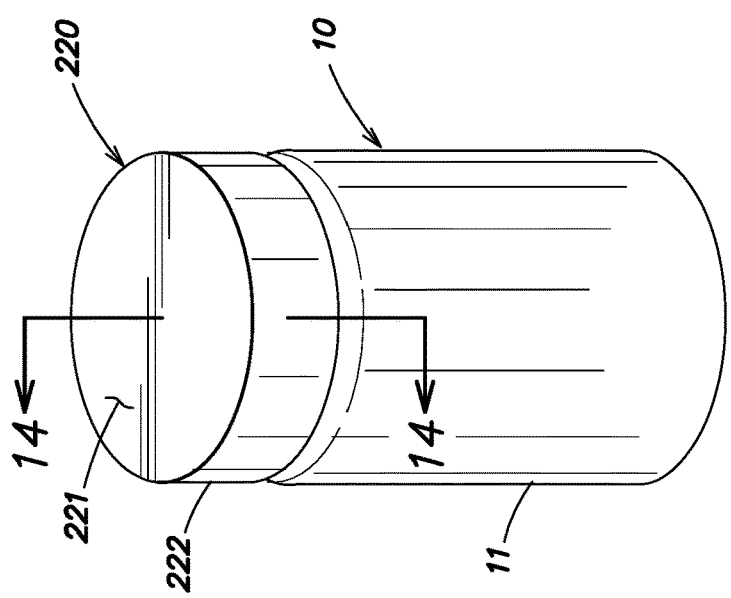

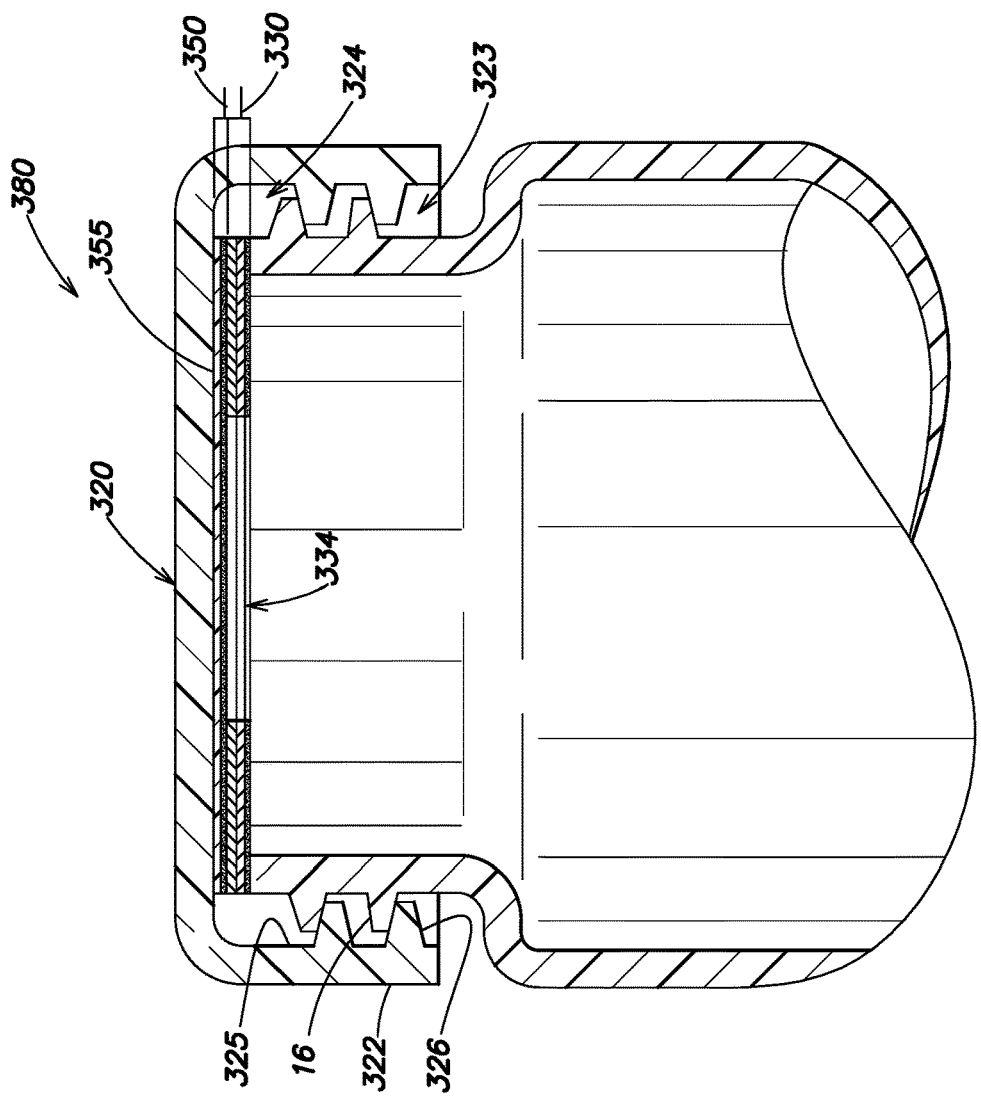
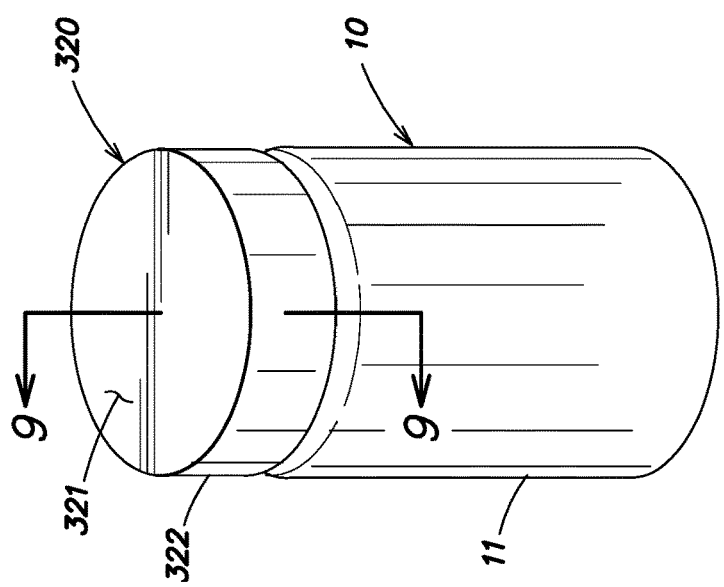
FIG. 19
FIG. 18

INDUCTION HEAT-SEAL CLOSURE LINER WITH RESTRICTED PRODUCT ORIFICE

FIELD OF THE INVENTION

The present invention relates to an induction heat-sealable liner having a restricted product orifice for sealing to a rim of a container and to a method of its fabrication and use.

BACKGROUND

Heat-sealable liners are induction heat-sealed to the rim of a container (also referred to as a neck finish or container mouth), thereby isolating the container contents from the exterior environment. There are two general methods of applying a heat seal liner, depending on whether it is applied alone (a one-element liner) or in combination with a backing liner (a two-element liner). To apply a one-element liner, the liner is punched from a sheet of heat seal liner material, inserted into a closure, the closure is screwed onto the neck of a previously filled container, and the closure is then passed under a heat sealer that bonds (via induction heating) the liner to the rim of the container. For a two-element liner, the combined liner is punched from a sheet of material that combines both the heat seal liner and backing liner layers, inserted into a closure, the closure is screwed onto the container, and the closure is passed under a heat sealer that both induction heat seals the heat-sealable liner to the rim and melts a layer (e.g., wax) between the heat seal liner and backing liner so that when the user removes the closure, the backing liner remains in the closure.

In various embodiments, the role of a heat-sealable liner is to render the container tamper proof, as well as provide a barrier between the contents and the exterior environment, e.g., for protecting drugs, medicine, or food packaged in the container. With a two-element liner, the secondary backing liner remains in the cap to provide a secondary tightness (barrier to the exterior) insofar as the heat seal liner has been partly or fully removed.

One type of heat-sealable liner includes a pull tab to facilitate removal of the liner from the mouth of the container. Generally, providing a pull tab greatly increases the complexity of the liner construction and its manufacturing process and cost. Some designs require use of a release coating to enable separation of a layer that becomes the tab. There are typically multiple lamination steps, and associated equipment required, resulting in high capital and manufacturing costs. In many cases, the tab acts as a point of failure, e.g., the tab ruptures or disconnects from the remaining liner portions before rupture of the induction heat seal bond with the mouth of the container. Furthermore, based on the tab design, the tab portion interferes with insertion of the liner into the closure and/or proper placement and application of the heat seal liner to the container rim (e.g., weaker seal at the tab).

It would thus be desirable to provide a simplified heat seal liner construction that can be more easily and inexpensively manufactured, while also providing the necessary barrier functionality and strength, e.g., to resist delamination of the liner or rupture of the pull tab while separating the liner from the mouth of the container and one that will not interfere with liner insertion or heat sealing.

It would also be desirable to provide an induction heat seal liner with a product orifice that is smaller (more restricted) than the opening provided by the rim (open mouth) of the container, for dispensing a product through the restricted orifice.

SUMMARY OF THE INVENTION

The present invention relates to an induction heat-sealed closure liner assembly having a restricted product orifice that is smaller than the mouth of the container to which the assembly is attached, to allow restricted dispensing of product through the orifice. The closure assembly is designed for storing and dispensing a product, such as a solid, liquid or paste product, and includes primary and secondary liner components that are positionable within a retainer portion of a cap to form the closure liner assembly.

In accordance with various embodiments of the invention, the liner has a vertically stacked two-part construction, formed from a top multi-layer component (a secondary liner) facing the inner top wall of the closure cap, and a bottom multi-layer component (a primary liner) facing the rim of the container, wherein both liner components are positionable within an inner closure area of the cap to form a closure assembly. After filling the container with product, the closure assembly is applied to the rim of the container and induction heat sealed thereto, forming a tamper evident closure seal. When the cap is removed (e.g., unscrewed) by the user, the secondary liner is bonded to the primary liner, and is visible as a tamper-evident seal. In one embodiment, the secondary liner is smaller than the primary liner and smaller than the rim of the container (lies inside the inner diameter of the rim) so as not to interfere with insertion in the container cap and not to interfere with inductive heat-seal bonding of the primary liner to the rim. The smaller secondary liner can then be removed by peeling from the primary liner (which remains bonded to the rim of the container) or broached by a user's finger or tool to enable removal of product through a restricted product orifice (smaller than the open mouth of the container) in the primary liner. In other embodiments, the secondary liner is permanently bonded to the primary liner and the secondary liner includes the restricted product orifice; once the cap is removed, the user can broach the primary liner in an area that lies below the restricted product orifice of the secondary liner to allow removal of the product through the restricted openings in both the primary and secondary liners.

In one embodiment, an induction heat-sealable closure assembly having a restricted product orifice is provided, the closure assembly comprising: two liner components (30, 50) and a closure cap (20) that are assembled to form a closure assembly (80), the two liner components comprising: a multi-layer primary liner (30) configured for inductive heat sealing to a rim surrounding an open mouth of a container, the primary liner having a restricted product orifice (34) extending therethrough that is smaller than the open mouth of the container and that is sized to dispense product therethrough; a multi-layer secondary liner (50) smaller in diameter than both the rim and the primary liner, the secondary liner having a central portion (55) covering the restricted product orifice (of the primary liner), a peelable bonded annular portion (58) surrounding the central portion that is temporarily bonded to the primary liner to seal the enclosed product orifice (34); and a further annular portion (59) surrounding the bonded portion forming an unbonded integral pull tab to assist a user in peeling the secondary liner from the primary liner to expose the restricted product orifice (34).

In one embodiment, an induction heat-sealable closure assembly having a restricted product orifice, the closure assembly comprising: two liner components (140, 160; 240, 260) and a closure cap (120; 220) that are assembled to form a closure assembly (180; 280), the two liner components comprising: a multi-layer primary liner (140; 240) configured for inductive heat sealing to a rim surrounding an open mouth of a container, a multi-layer secondary liner (160; 260) having a restricted product orifice (165; 265) extending therethrough that is smaller than the open mouth of the container and that is sized to dispense product therethrough, the secondary liner configured to be permanently bonded to the primary liner; the primary liner (140; 240) having a central area (144A; 244A) defined by a perforated edge (144P; 244P) that matches the diameter of the restricted product orifice (165; 265), wherein the perforated edge assists a user in broaching the central area (144A; 244A) of the primary liner thereby forming, together with the product orifice (165; 265), a combined restricted product orifice extending through both the primary and secondary liners for dispensing product therethrough.

In one embodiment, an induction heat-sealable closure assembly having a restricted product orifice is provided, the closure assembly comprising: two liner components (330, 350) and a closure cap (320) that are assembled to form a closure assembly (380), the two liner components comprising: a multi-layer primary liner (330) configured for inductive heat sealing to a rim surrounding an open mouth of a container, the primary liner having a restricted product orifice (334) extending therethrough that is smaller than the open mouth of the container and that is sized to dispense product therethrough; a multi-layer secondary liner (350) permanently bonded (not peelable) to the top of primary liner, the secondary liner (350) having a central area (355) disposed above the restricted product orifice (334) of the primary liner and configured to be broached by a user's finger or tool thereby forming, together with the restricted product orifice (334), a combined restricted product orifice (extending through both the primary and secondary liners) for dispensing product therethrough.

In various embodiments, the primary liner comprises at least three layers.

In various embodiments, the secondary liner comprises at least two layers.

In various embodiments, the primary liner and/or secondary liner comprise one or more metal layers.

In various embodiments, the primary liner and/or secondary liner comprise one or more layers of PET and/or polyolefin film.

In various embodiments, the closure assembly further comprising a peelable liner (500) that is temporarily attached to the top surface of the secondary liner (160) to cover the restricted product orifice (165).

In various embodiments, the restricted product orifice (34) in the secondary liner comprises a single opening or multiple openings.

According to one method of making the closure assembly, the primary liner and secondary liner are inserted into the closure cap prior to induction heat sealing of the primary liner to the container rim.

According to one method of making the closure assembly, the primary liner and secondary liner are bonded together to form a liner assembly, and the liner assembly is inserted into the closure cap for induction heat sealing of the primary liner to the container rim.

In one embodiment, there is provided a closure liner assembly configured for sealing an annular rim defining an open mouth of a product container, the closure liner assembly comprising:

a primary liner (30; 330) of planar configuration with opposing top and bottom surfaces and an annular periphery dimensioned to span the open mouth of the container, the primary liner having multiple layers in a direction transverse to a plane defining the open mouth of the container, the multiple layers including a lowermost heat induction heat seal layer forming the bottom surface for bonding to the rim of the container, an uppermost polymer layer forming the top surface, and an intermediate metal foil layer, the primary liner having a restricted product orifice (34; 334; 34') with one or multiple openings and having a periphery smaller than the open mouth and extending in the transverse direction through the multiple layers of the primary liner;

a secondary liner (50; 350) of planar configuration disposed adjacent the top surface of the primary liner and having a central portion dimensioned to cover the restricted product orifice and an outer peripheral portion that is smaller than the periphery of the primary liner, a cap (20; 320) having a top wall and a depending annular skirt defining an inner closure area configured to releasably engage with the neck of the container and including a retainer portion for temporarily retaining the primary and secondary liners within the inner closure area, wherein said primary liner and secondary liner are positionable within the retainer portion of the cap to form a closure liner assembly, and the closure liner assembly is positionable to seal the open mouth of the product container by induction heat sealing of the lowermost heat seal layer to the rim, wherein upon removal of the cap from the container, the secondary liner remains bonded to the top surface of the primary liner as a tamper evident closure of the restricted product orifice, and the secondary liner is configured to be peeled from the top surface of the primary liner to open the restricted product orifice to enable removal of the product, or the central portion of the secondary liner over the restricted product orifice is configured to be broached to open the product orifice to enable removal of the product.

In one embodiment, a closure liner assembly configured for sealing an annular rim defining an open mouth of a product container, the closure liner assembly comprising:

a primary liner (140; 240) of planar configuration with opposing top and bottom surfaces and an annular periphery dimensioned to span the open mouth of the container, the primary liner having multiple layers in a direction transverse to a plane defining the open mouth of the container, the multiple layers including a lowermost heat induction heat seal layer forming the bottom surface for bonding to the rim of the container, an uppermost polymer layer forming the top surface, and an intermediate metal foil layer, a secondary liner (160; 260) of planar configuration disposed adjacent the top surface of the primary liner and having a restricted product orifice with a periphery smaller than the open mouth and extending in the transverse direction and sized to dispense product therethrough, the secondary liner configured to be permanently bonded to the primary liner, a cap having a top wall and a depending annular skirt defining an inner closure area configured to releasably engage with the neck of the container and including a retainer portion for temporarily retaining the primary and secondary liners within the inner closure area, wherein said primary liner and secondary liner are positionable within the retainer portion of the cap to form a closure liner assembly, and the closure liner assembly is positionable to seal the open mouth of the product container by induction heat sealing of the lowermost heat seal layer to the rim, wherein upon removal of the cap from the container, the secondary liner remains bonded to the top surface of the primary liner as a tamper evident closure of the restricted product orifice, and the primary liner (140; 240) having a central area (144A; 244A) defined by a perforated edge (144P; 244P) that matches the diameter of the restricted product orifice (165), wherein the perforated edge assists a user in broaching the central area (144A; 244A) of the primary liner thereby forming, together with the product orifice (165; 265), a combined restricted product orifice extending through both the primary and secondary liners for dispensing product therethrough.

In one embodiment, the primary liner comprises at least three layers.

In one embodiment, the secondary liner comprises at least two layers.

In one embodiment, the primary liner and/or secondary liner comprise one or more metal layers.

In one embodiment, the primary liner and/or secondary liner comprise one or more layers of PET and/or polyolefin film.

In one embodiment, the closure assembly further comprising a peelable liner (500) that is temporarily attached to the top surface of the secondary liner (160) to cover the restricted product orifice (165).

BRIEF DESCRIPTION OF THE DRAWINGS

FIGS. 1-5 illustrate a first embodiment of the invention, wherein FIG. 1 is a perspective view of a closure assembly attached to the upper end of a container; FIG. 2 is a cross-sectional view of the closure assembly and container taken along section lines 2-2 of FIG. 1; FIG. 3 is an exploded view of the various components of the closure assembly, removed from the container, including a cap, a primary liner having a restricted product orifice, and a secondary liner which covers the product orifice on the primary liner and is smaller than the primary liner and smaller than the rim of the container (lies inside the inner diameter of the rim) so as not to interfere with insertion in the container cap and not to interfere with inductive heat-seal bonding of the primary liner to the rim; FIG. 4 is a cross-sectional view showing the primary liner sealed to the rim (defining the open mouth) of the container, and the secondary liner partially peeled away from the primary liner to expose the restricted product orifice; FIG. 5 is a top view showing various radially-disposed, annular portions of the secondary liner including: a central portion covering the product outlet orifice, an adjacent radially outwardly disposed first annular portion bonded to the primary liner, and a further radially outwardly disposed second annular portion not bonded to the primary liner that serves as an integral pull tab (to be grasped by the user) to peel away the secondary liner and expose the restricted product orifice of the primary liner;

FIGS. 13-17 are various views, similar to the views of FIGS. 1-5, but of a third embodiment of a closure assembly of the invention wherein: a restricted product orifice is provided in the secondary liner (rather than the primary liner); the primary and secondary liners (having four and three layers respectively) both have substantially the same diameter, the bottom layer of the secondary liner is fully bonded to the primary liner, and the area of the secondary liner that is disposed over the product orifice is configured to be broached (by a user finger or tool) to allow dispensing from the product orifice;

FIGS. 18-22 are various views, similar to the views of FIGS. 1-5, but of a fourth embodiment of a closure assembly of the invention wherein: the restricted product orifice is provided in the primary liner; the primary and secondary liners (having two and three layers respectively) both have substantially the same diameter, the bottom layer of the secondary liner is fully bonded to the primary liner, and the area of the secondary liner that is disposed over the restricted product orifice is configured to be broached (by a user finger or tool) to allow dispensing from the product orifice;

DETAILED DESCRIPTION

Figure 3:
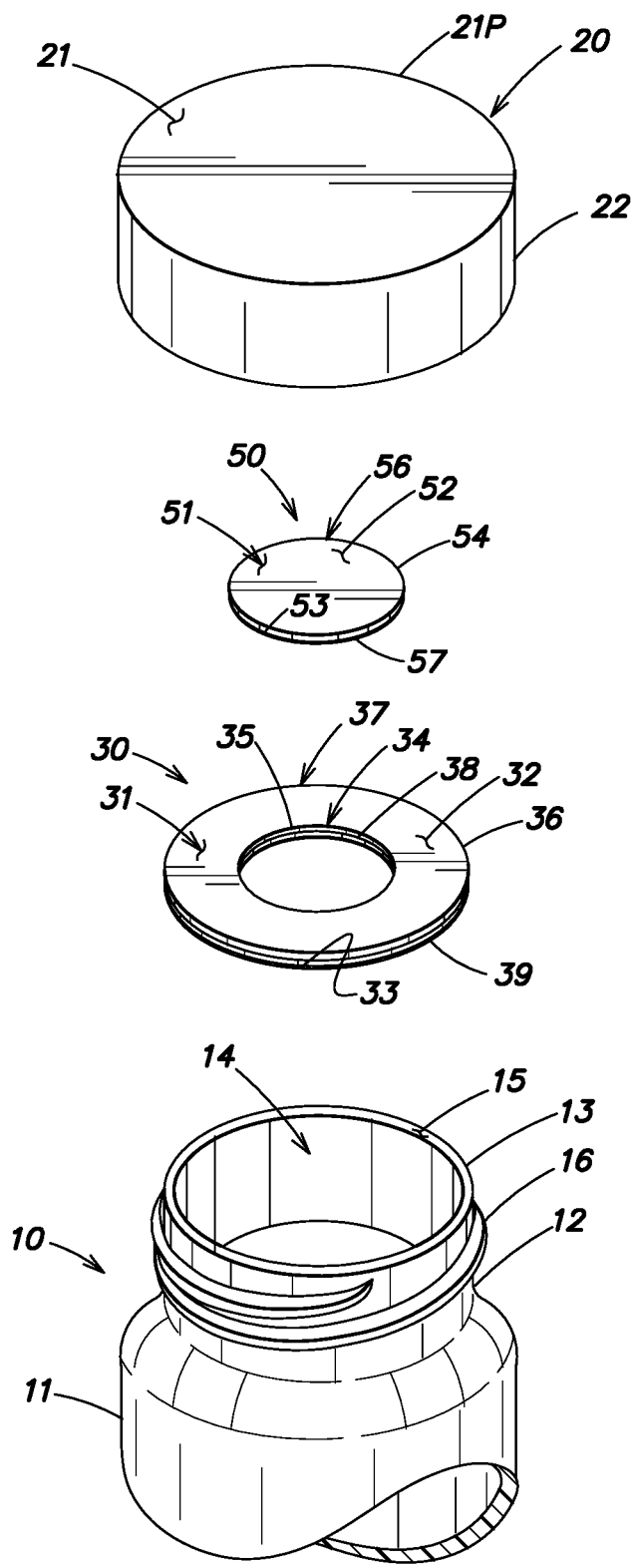
Figure 5:
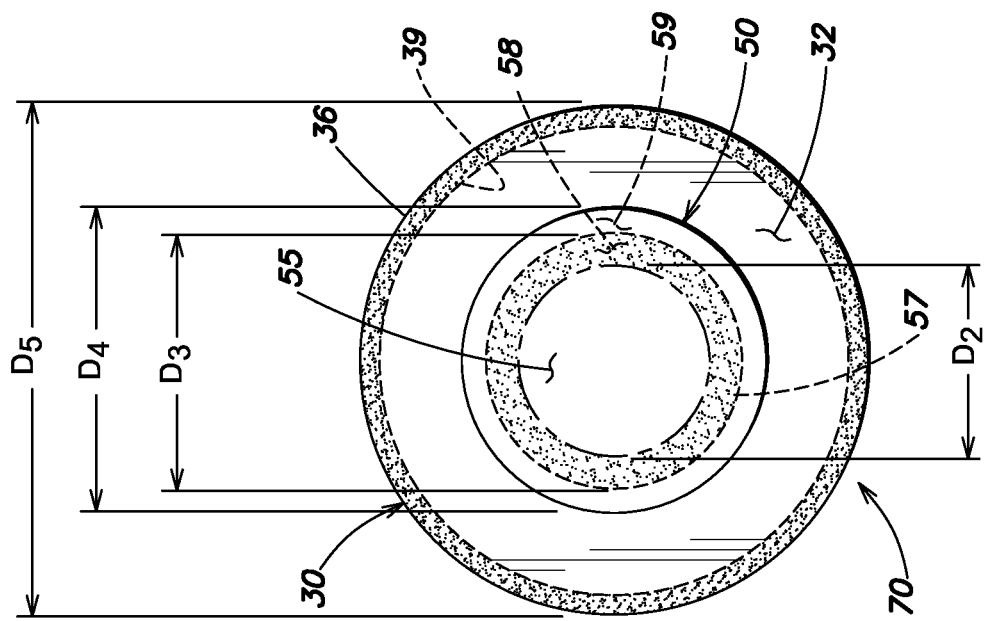

The present invention provides, in various embodiments, one or more of the following features/advantages:

1) An induction heat-sealed closure liner assembly having a built-in restricted product outlet orifice.
2) An induction heat-sealed closure liner assembly having two vertically stacked liner components—a bottom primary liner component having a restricted product outlet orifice and disposed facing the rim of the container, and a top secondary liner component disposed facing the inner top wall of the closure cap, that temporarily seals and is peeled away from the top surface of the primary liner to expose the restricted product orifice.
3) The primary and secondary liners are stacked and optionally bonded to form a liner assembly which liner assembly can then be inserted into a closure cap to form a closure assembly. The closure assembly is then applied to the container for ease of application and for consistent/effective heat seal application to the container rim.
4) The secondary liner is smaller than the primary liner and smaller than the rim of the container (lies inside the inner diameter of the rim) so as not to interfere with insertion in the container cap and not to interfere with inductive heat-seal bonding of the primary liner to the rim. The secondary liner includes three radially disposed areas: a central area that covers a restricted product orifice in the primary liner, a bonded area radially outwardly disposed from and adjacent to the central area that seals the secondary liner to the primary liner and as a result seals the product orifice from the environment; and a further more radially outwardly disposed non-bonded area (surrounding the bonded area) forming an integral pull tab that does not interfere with insertion of the liner assembly into the closure cap nor with heat sealing of the liner to the container rim.
5) The secondary liner may be bonded to the primary liner by: induction heat sealing when the closure assembly is heat sealed to the container rim; and/or by bonding the two liners prior to insertion into the closure cap (and prior to the induction hearting step that bonds the closure assembly to the container rim).
6) The induction heat-sealed closure liner assembly having a built-in restricted product outlet orifice can be used with different types and sizes of closures, including child-resistant closures, non-child resistant closures, and both threaded and non-threaded (e.g., snap-on) closure caps.
7) The multi-layer structure of the primary liner and/or secondary liner allows for different material combinations (e.g., including a foil layer, or non-foil material layers) for different product/closure/container applications.
8) The secondary liner may be configured to be peeled off from the primary liner, or configured to be broached by breaking through the secondary liner in an area above the restricted product orifice in the primary liner in order to release individual solid product articles from the container.
9) The restricted product orifice may be provided in the secondary liner, as opposed to in the primary liner, in which case the secondary liner is permanently bonded to the primary liner, and user then broaches an area of the primary liner that lies below the restricted product orifice of the secondary liner to enable removal of individual solid product articles through the restricted product opening formed through both the secondary and primary liners.

Figure 6:
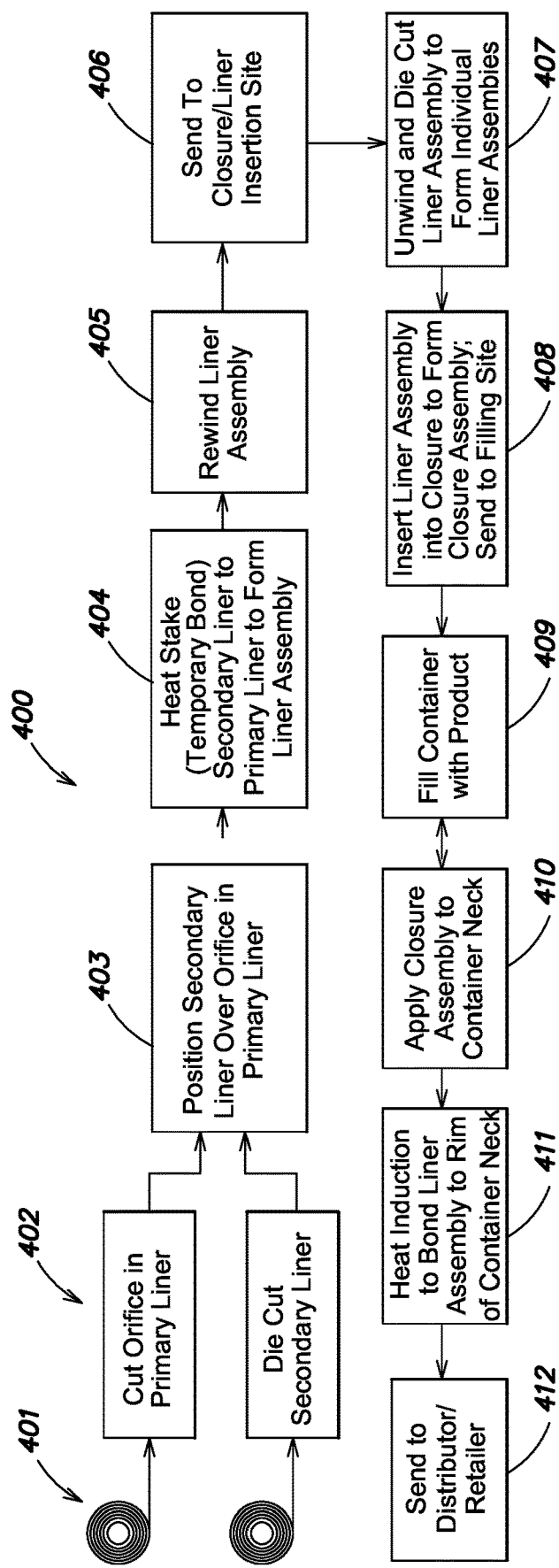
FIG. 6 is a schematic view depicting various steps according to one method of the invention of making and applying a closure assembly (e.g., of FIGS. 1-5) to a container.
Figure 7:
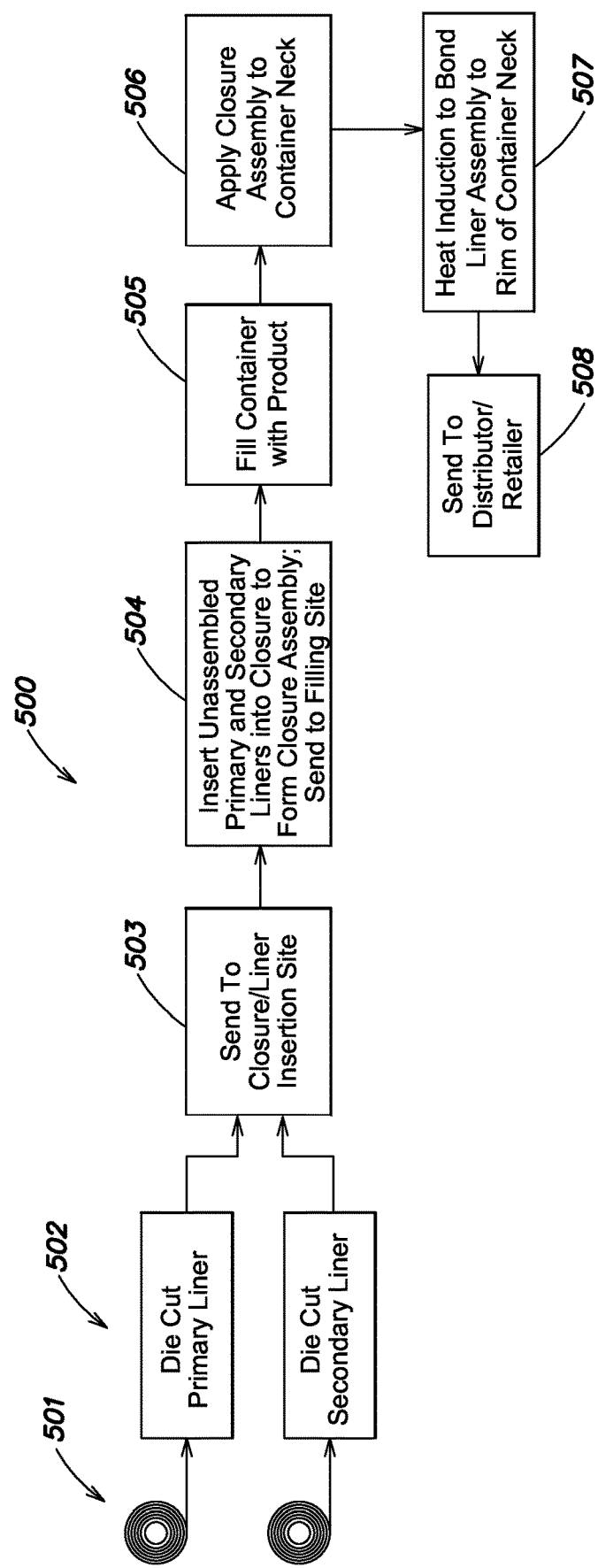
FIG. 7 is a schematic view depicting various steps according to another method of the invention of making and applying a closure assembly (e.g., of FIGS. 1-5) to a container.
Figure 9:
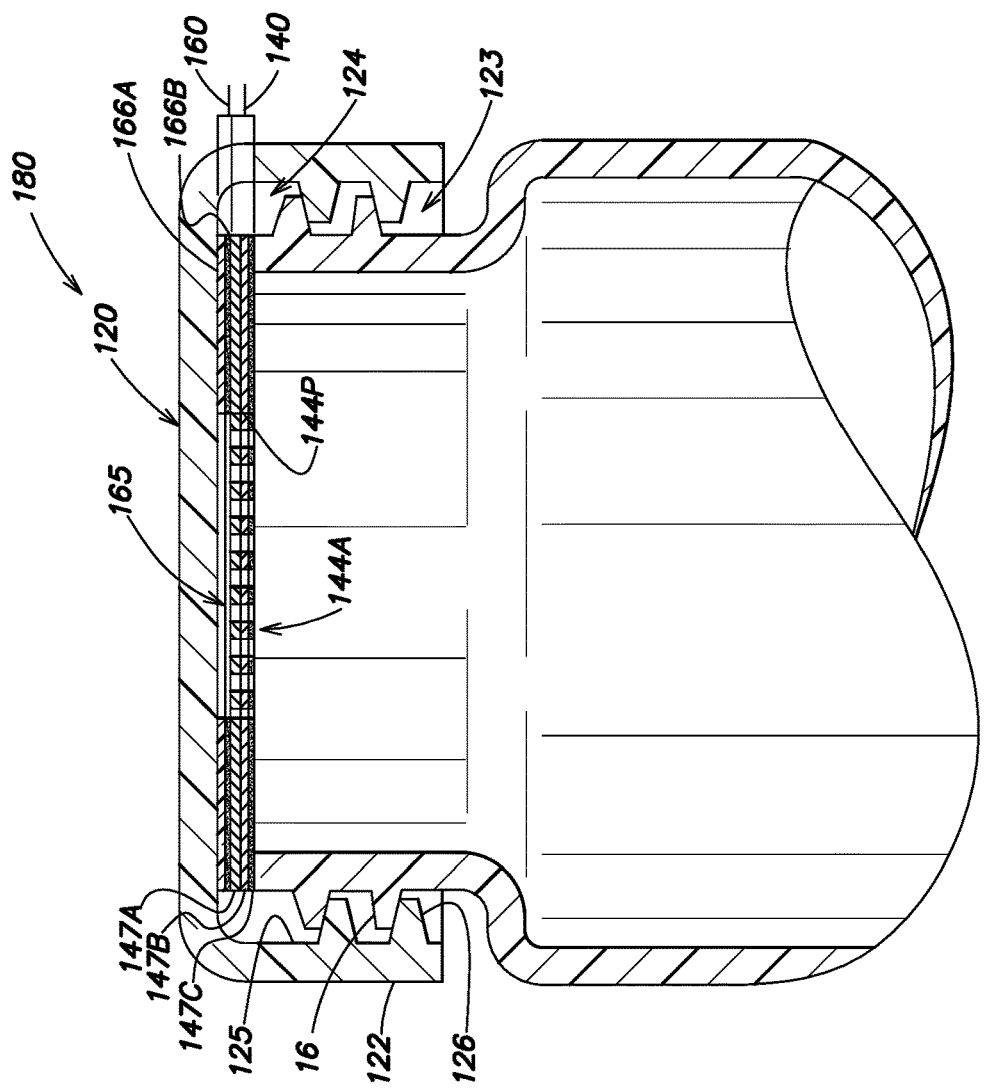
FIGS. 8-12 are various views, similar to the views of FIGS. 1-5, but of a second embodiment of a closure assembly of the invention wherein: a restricted product orifice is provided in the secondary liner (rather than the primary liner); the primary and secondary liners (having two and three layers respectively) both have substantially the same diameter, the bottom layer of the secondary liner is fully bonded to the primary liner, and the area of the secondary liner that is disposed over the product orifice is configured to be broached (by a user finger or tool) to allow dispensing from the product orifice.
Figure 8:
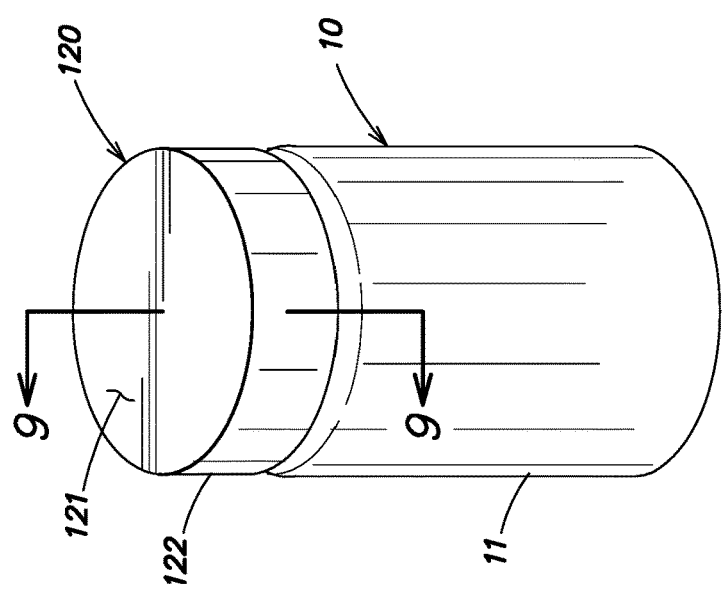
Figure 10:
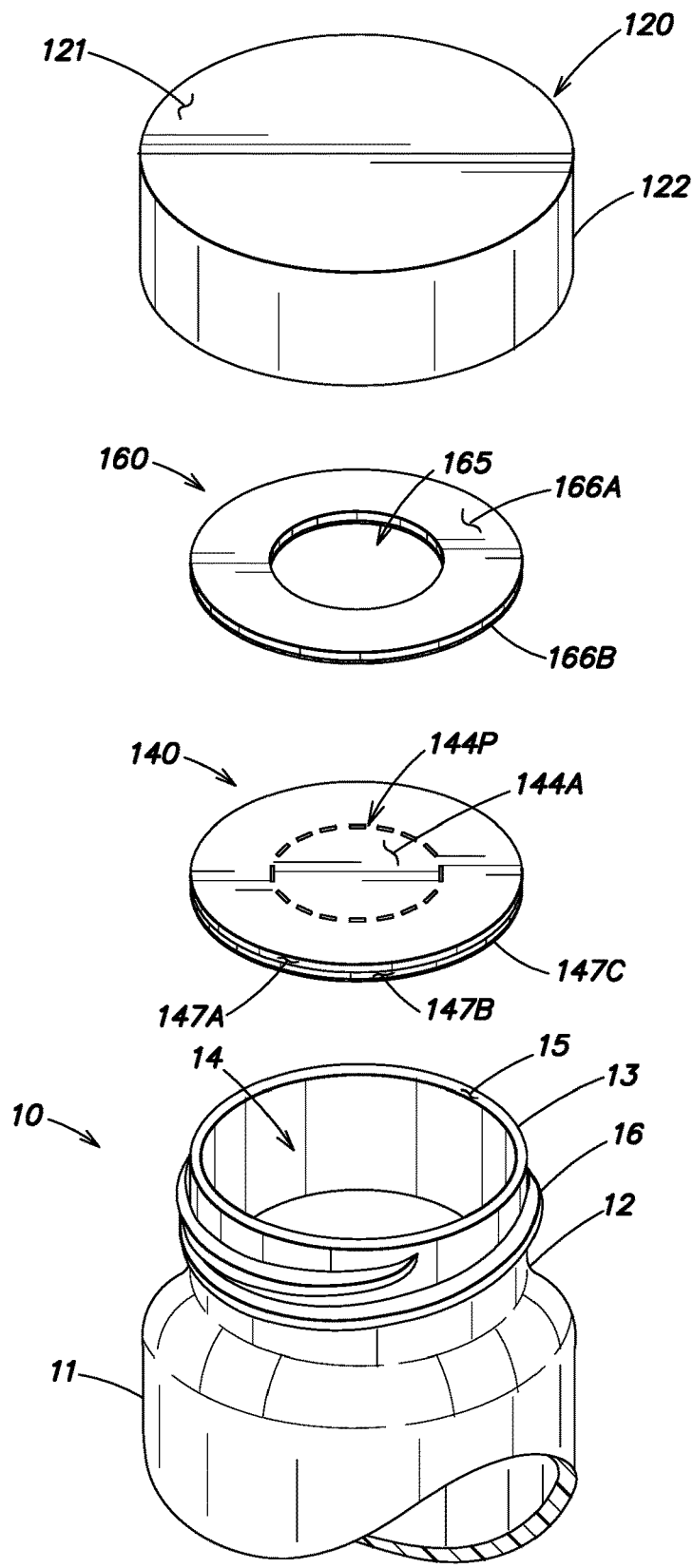
Figure 12:
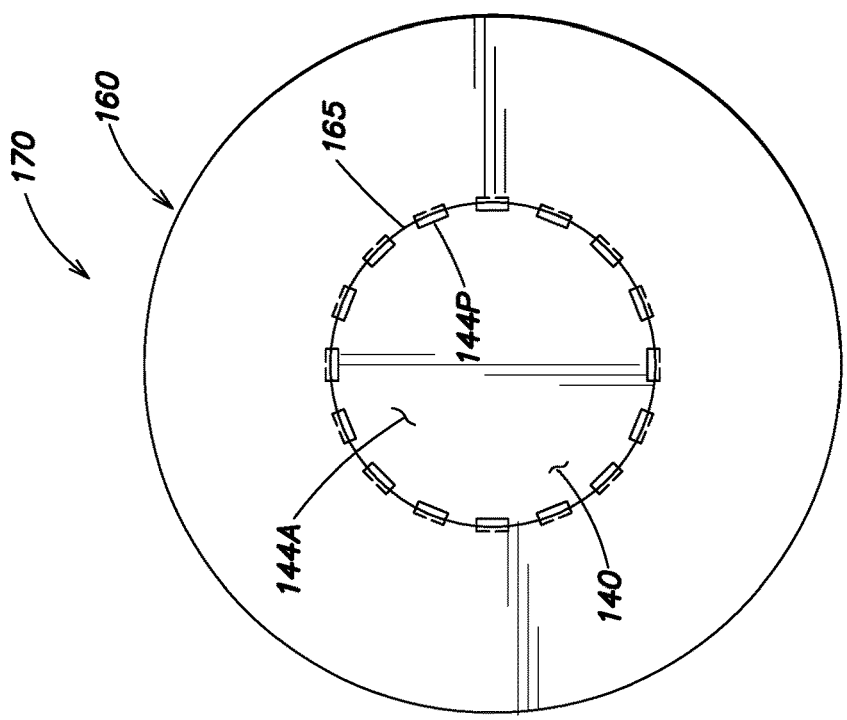
Figure 11:
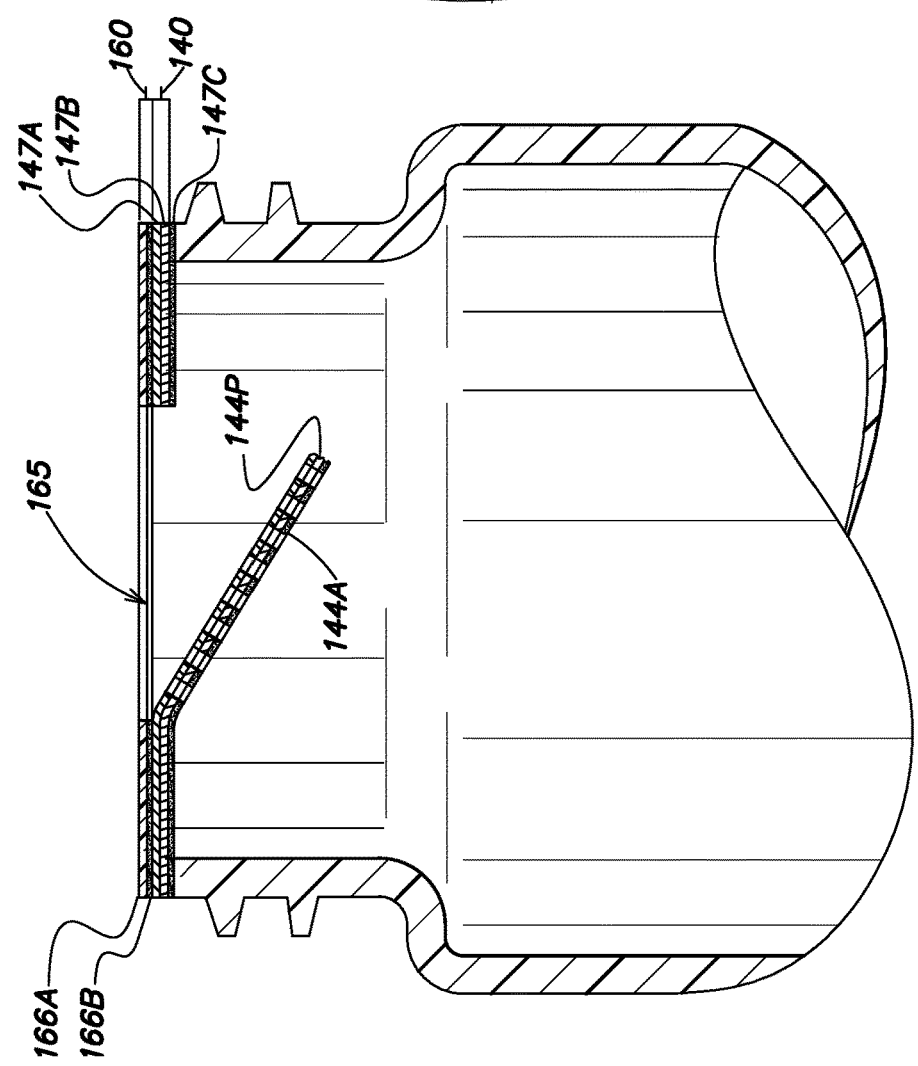
Figure 15:
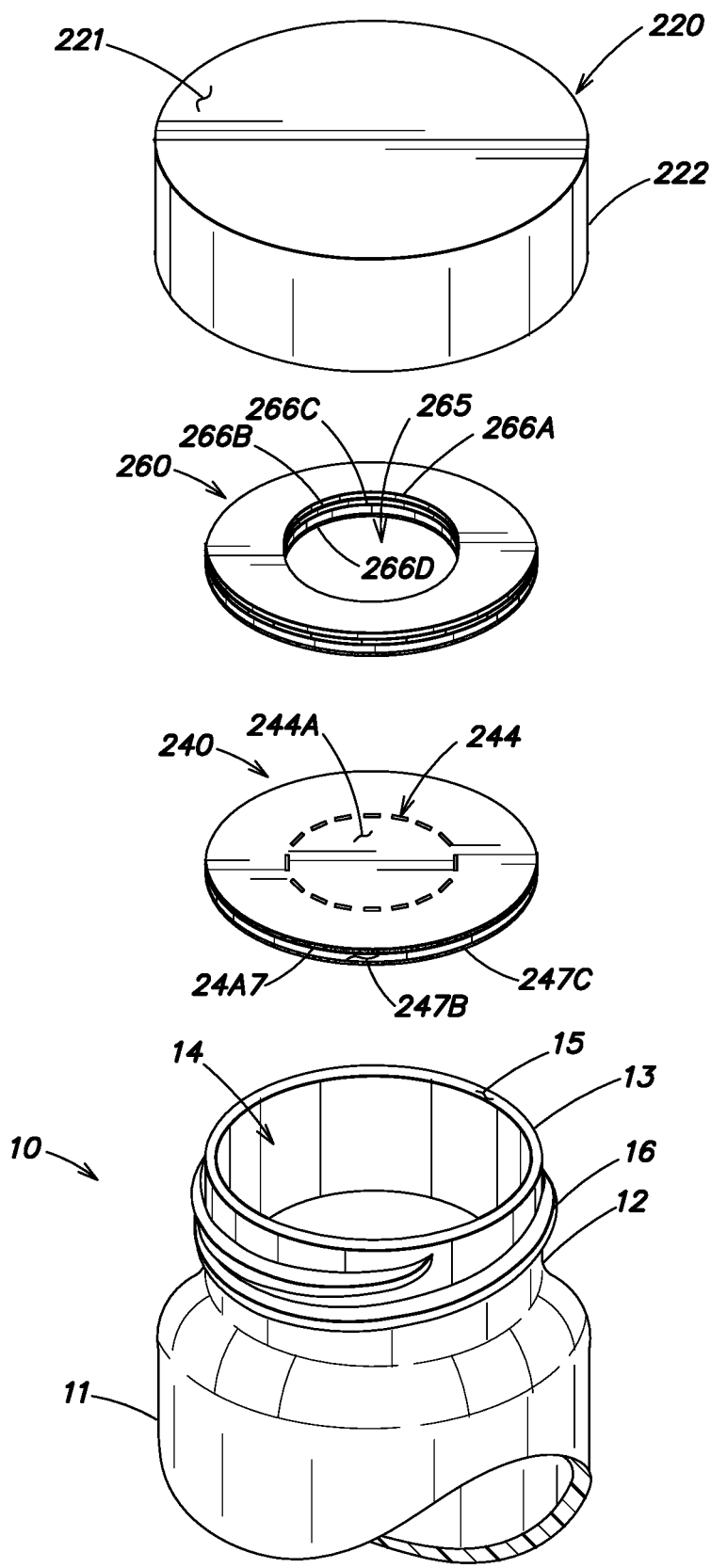
Figure 17:
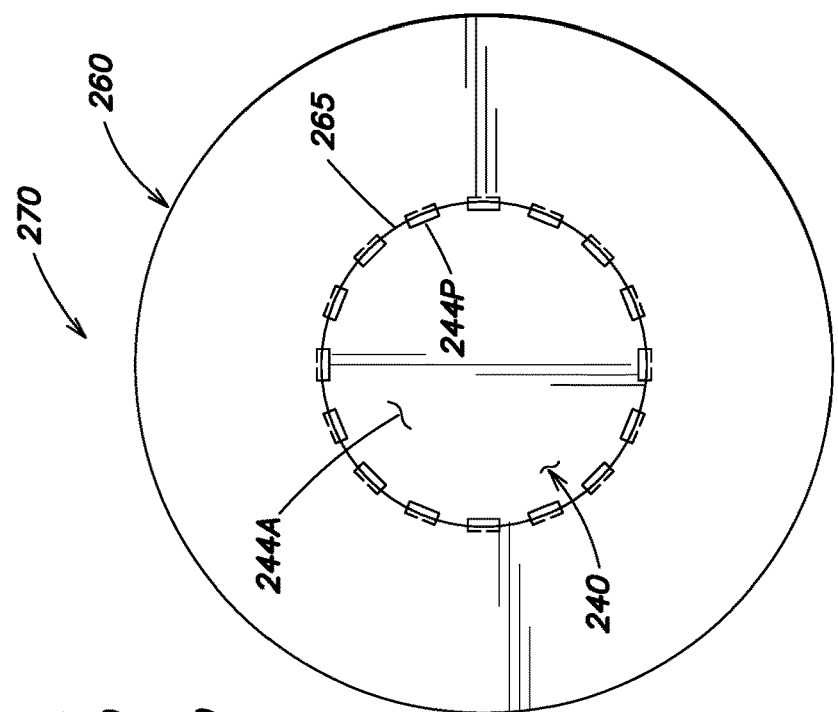
Figure 16:
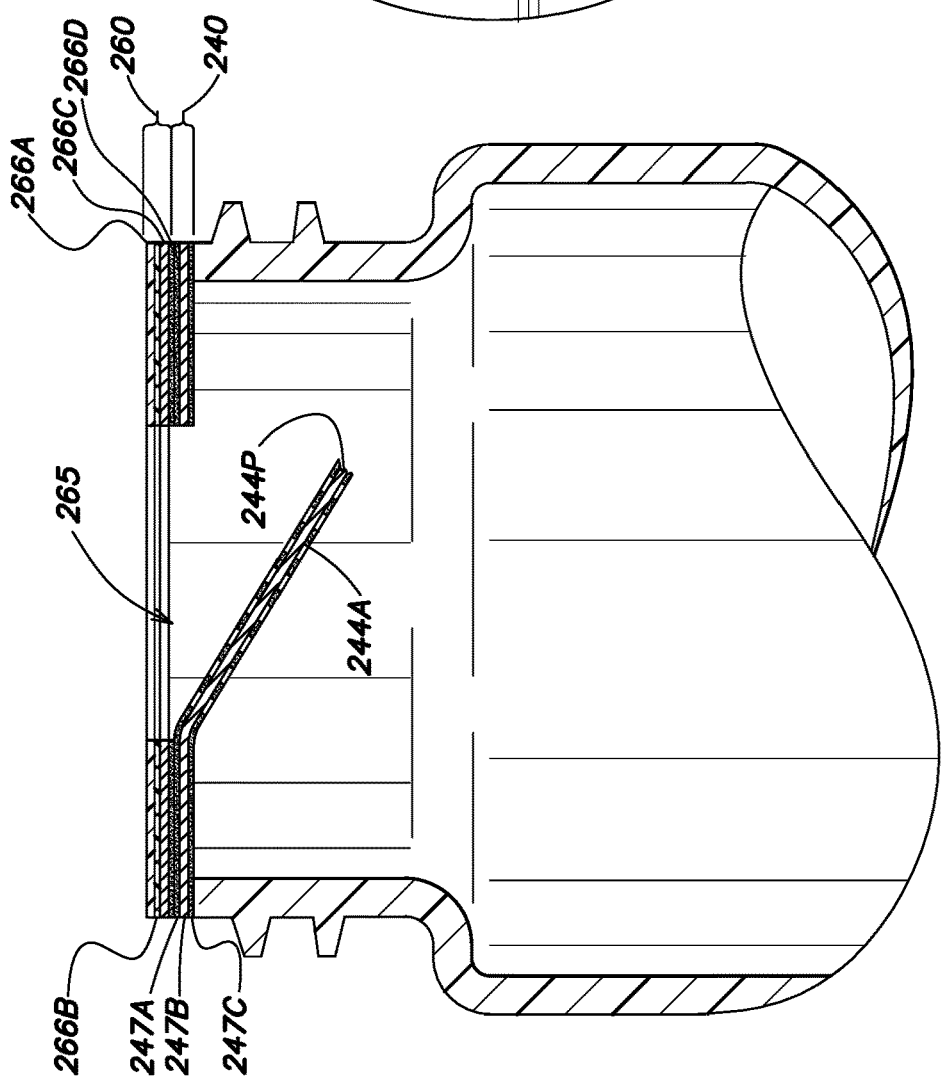
Figure 20:
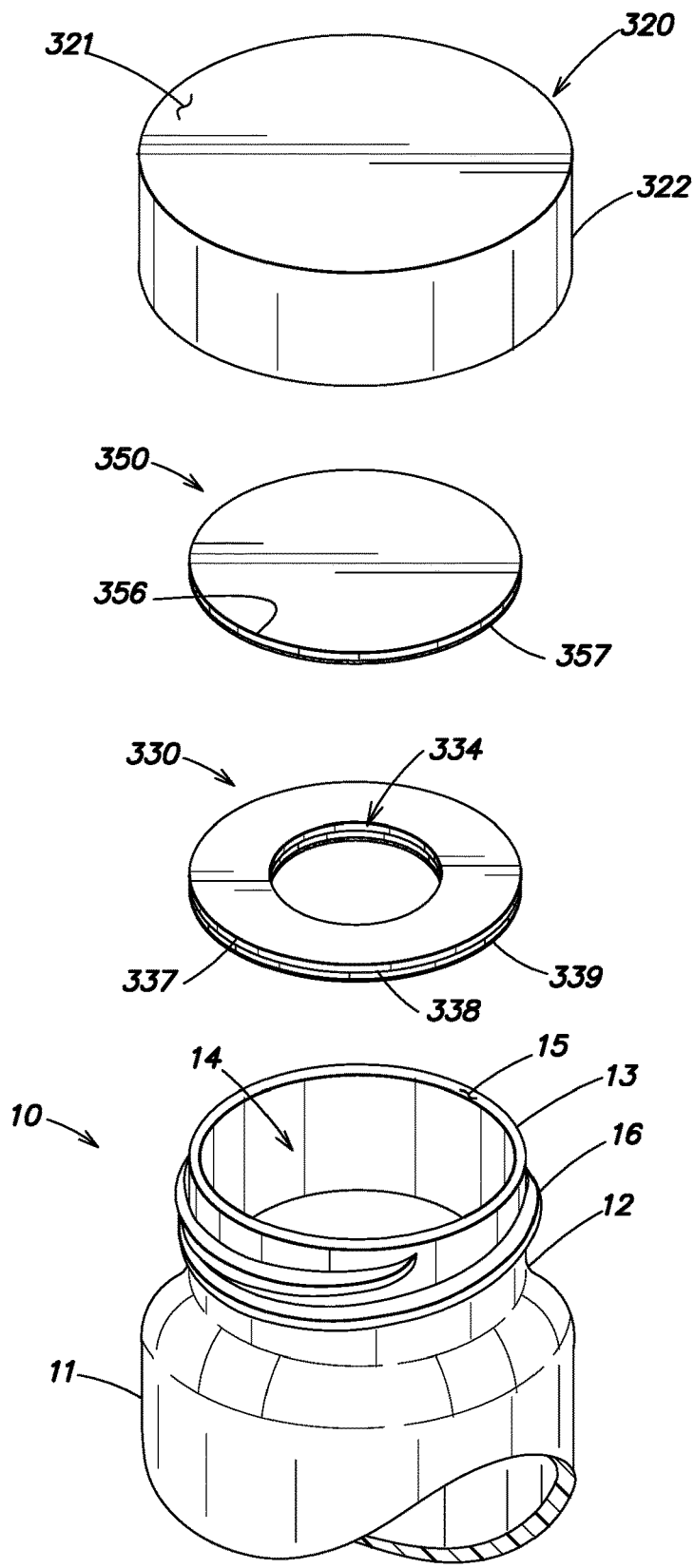
Figure 22:
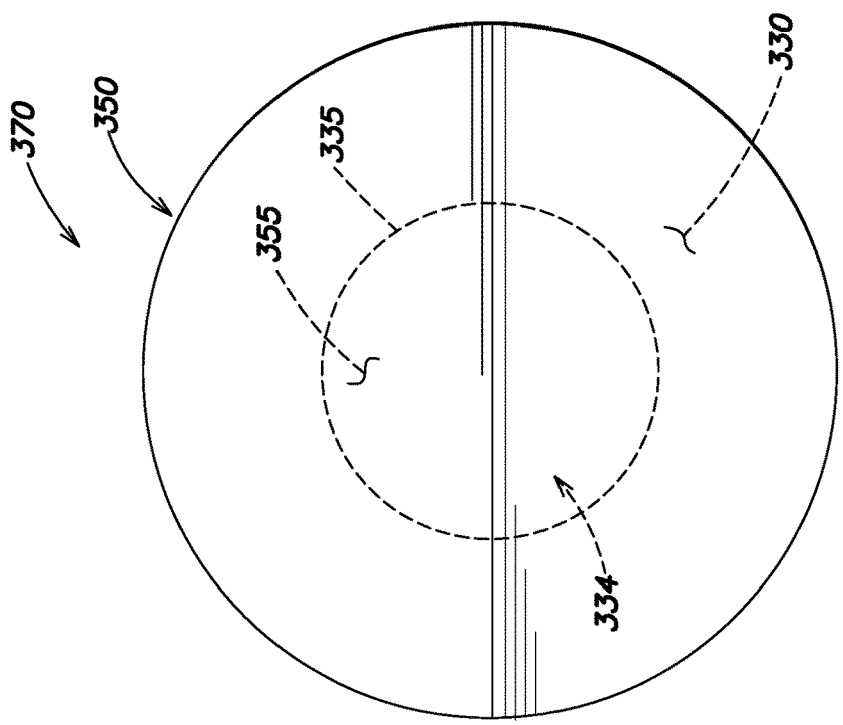
Figure 21:
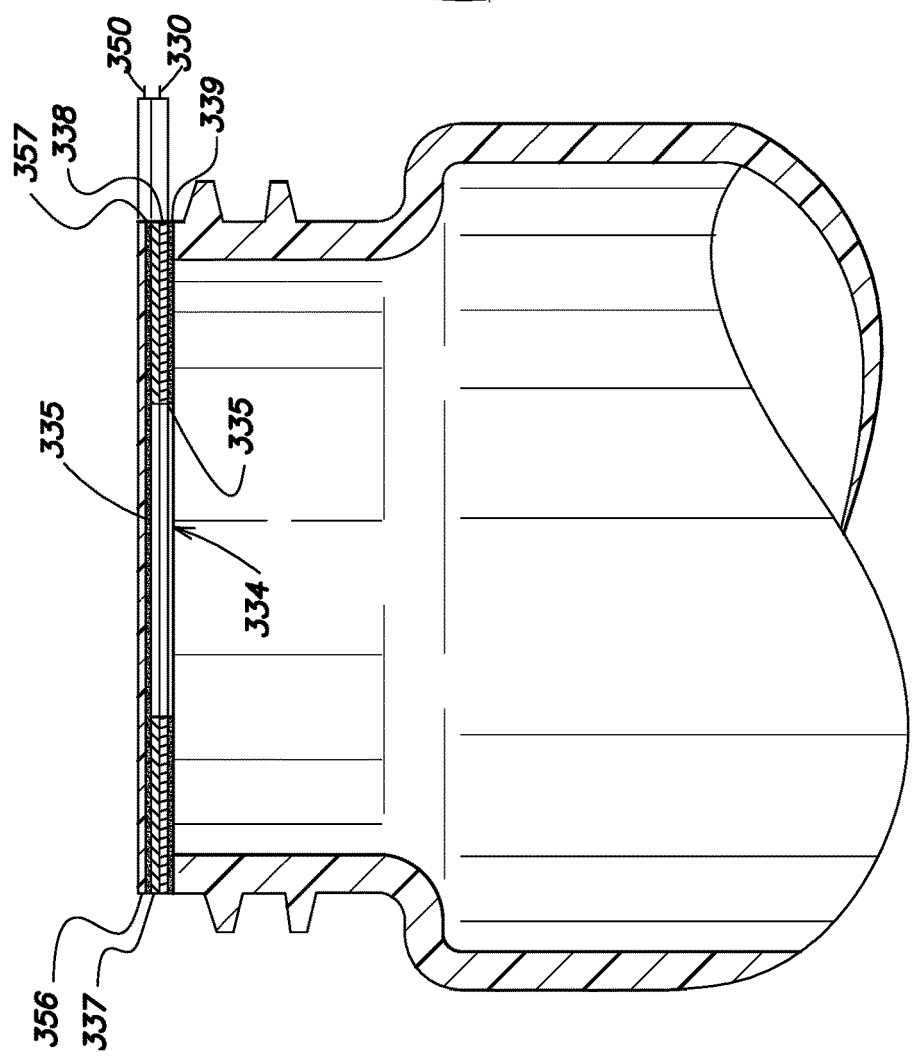
Figure 23:
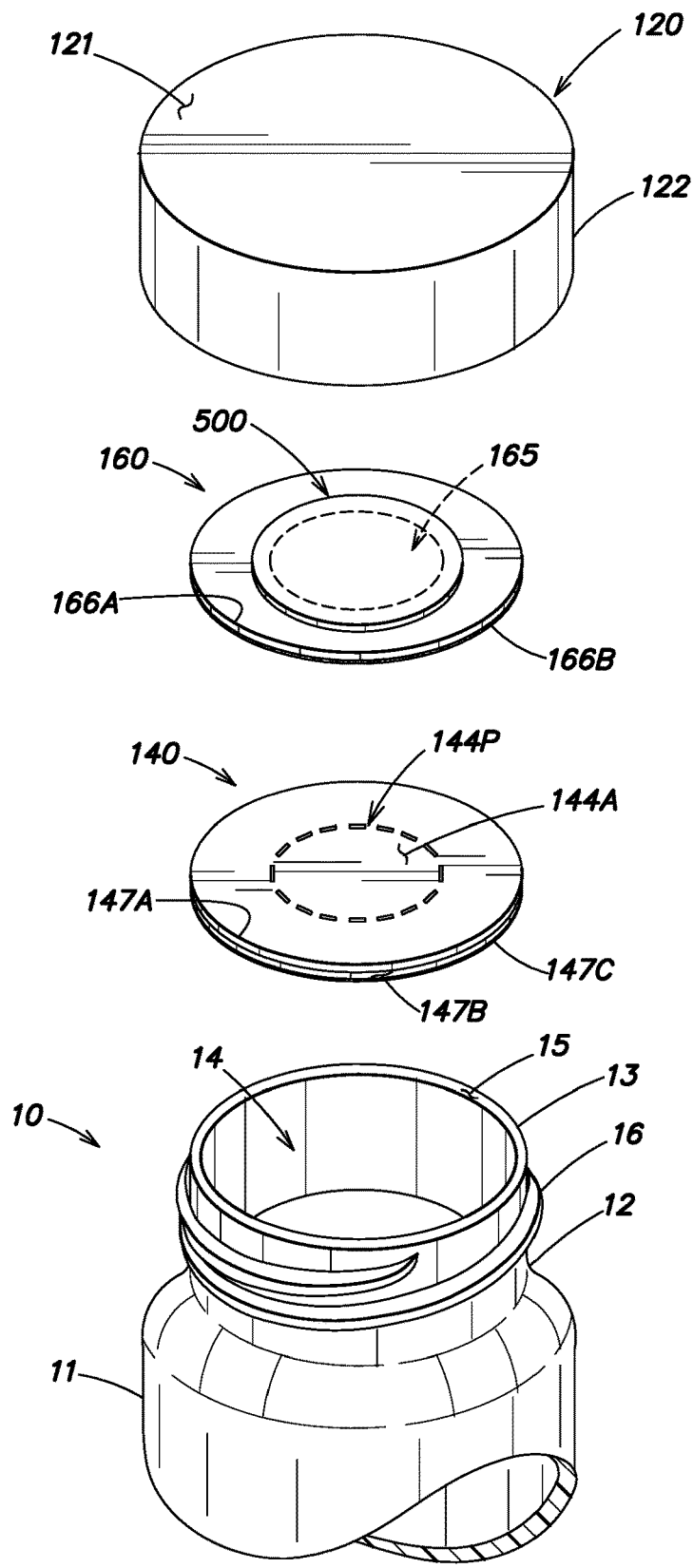
FIG. 23 shows a view, similar to the view of FIG. 2, of a closure assembly including a further tertiary stacked liner component (800) configured to releasably cover the restricted product orifice (165, 265) of the secondary liner (e.g., in the second (FIGS. 8-12) and third (FIGS. 13-17) embodiments).

Various embodiments of the invention are shown in the accompanying figures:

FIGS. 1-5 show a first embodiment of two liner components (30, 50) and a closure cap (20) that are assembled to form a closure assembly (80), the two liner components comprising: a three-layer (3L) primary liner (30) having a restricted product orifice (34); a two-layer (2L) secondary liner (50) having a central portion (55) covering the restricted product orifice (of the primary liner), a bonded annular portion (58) surrounding the central portion that is bonded to the primary liner to seal the enclosed product orifice (34); and a further annular portion (59) surrounding the bonded portion forming an integral pull tab to assist a user in peeling the secondary liner from the primary liner to expose the restricted product orifice (34); the secondary liner is smaller than the primary liner and smaller than the rim of the container (lies inside the inner diameter of the rim) so as not to interfere with insertion in the container cap and not to interfere with inductive heat-seal bonding of the primary liner to the rim;

FIGS. 6-7 show two method embodiments of making and using the liner components and resulting closure assembly to seal the mouth of a container;

FIGS. 8-12 show a second embodiment of two liner components (140, 160) and a closure cap (120) that are assembled to form a closure assembly (180), the two liner components comprising: a two-layer (2L) secondary liner (160) having a restricted product orifice (165), the secondary liner configured to be permanently bonded (not peelable) to the primary liner; a three-layer (3L) primary liner (140) having a central area (144A) defined by a perforated edge (144P) that matches the diameter of the restricted product orifice (165), wherein the perforated edge assists a user in broaching the central area 144A of the primary liner thereby forming, together with the product orifice (165), a combined restricted product orifice (extending through both the primary and secondary liners) for dispensing product therethrough;

FIGS. 13-17 show a third embodiment of two liner components (240, 260) and a closure cap (220) that are assembled to form a closure assembly (280), similar to the second embodiment, the two liner components comprising: a permanently bonded (not peelable) four-layer (4L) secondary liner (260) having a restricted product orifice (265); and a three-layer (3L) primary liner (240) having a central area (244A) defined by perforated edge (244P) that matches the diameter of the product orifice (265), wherein the perforated edge assists a user in broaching the central area 244A of the primary liner thereby forming, together with the product orifice (265), a combined restricted product orifice (extending through both the primary and secondary liners) for dispensing product therethrough;

FIGS. 18-22 show a fourth embodiment of two liner components (330, 350) and a closure cap (320) that are assembled to form a closure assembly (380), the two liner components comprising: a bonded (not peelable) two-layer (2L) secondary liner (350); and a three-layer (3L) primary liner (330) having a restricted product orifice (334), where the central area (355) of the secondary liner (350) that lies above the restricted product orifice (334) of the primary liner is broached by a user's finger or tool thereby forming, together with the product orifice (334), a combined restricted product orifice (extending through both the primary and secondary liners) for dispensing product therethrough; and FIG. 23 shows a tertiary ($3^{rd}$) liner component added to the second embodiment of FIGS. 8-12, the $3^{rd}$ liner being a small peelable liner (500) temporarily attached to the top surface of the secondary liner (160) to cover the restricted product orifice (165).

Figure 24:
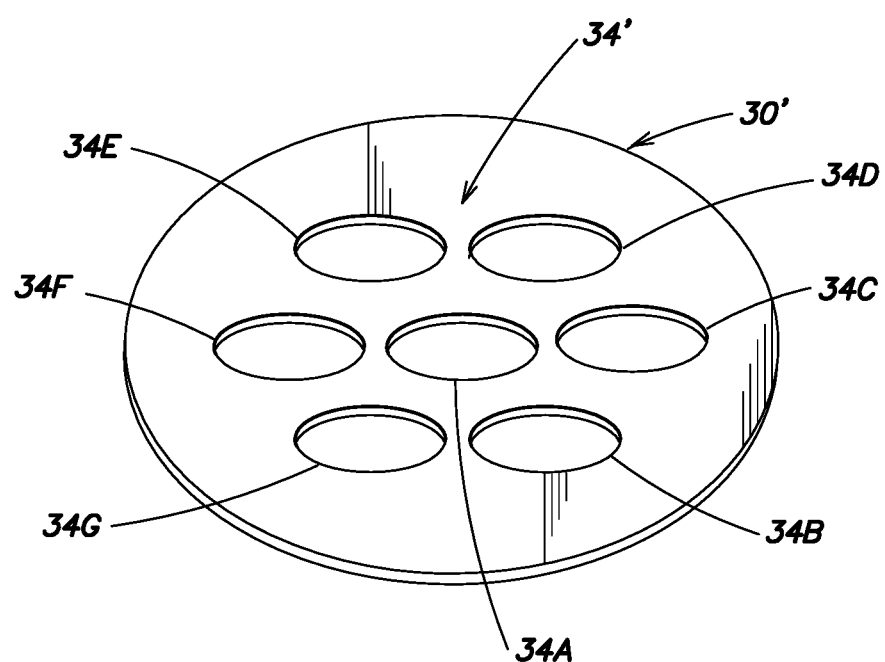
FIG. 24 shows an alternative primary liner (30$^1$) having a restricted product orifice 34' having multiple openings, for use in the first and fourth embodiments (replacing primary liner (30, 330) having a restricted product orifice (34, 340) with a single opening). The multiple openings (e.g. 7 shown in FIG. 24) are useful for dispensing spices or other granular products.

FIG. 24 shows an alternative primary liner component (30$^1$) having a restricted product orifice (34') with multiple openings, as opposed to the single opening of the restricted product orifice (34, 340) of the first and fourth embodiments. All of the openings are covered by the central area of the secondary liner.

FIGS. 1-5

FIGS. 1-5 show a first embodiment of a closure assembly according to the present invention. The following reference numbers are used to designate the indicated parts:

- 5 a product
- 10 a container having:
  - 11 body
  - 12 neck
  - 13 rim
  - 15 top sealing surface (TSS)
  - 16 outer thread
- 20 a cap having:
  - 21 top wall
  - 22 annular skirt
  - 23 inner closure area
  - 24 retainer portion
  - inner surface
  - 26 inner thread
- 30 a primary liner having:
  - 31 disk-shaped planar body
  - 32 top surface
  - 33 bottom surface
  - 34 product orifice
  - 35 inner annular edge
  - 36 outer annular edge
  - 37 top layer
  - 38 intermediate layer
  - 39 bottom layer
- 50 a secondary liner having:
  - 51 disk-shaped planar body
  - 52 top surface
  - 53 bottom surface
  - 54 outer annular edge
  - 55 central area
  - 56 top layer
  - 57 bottom layer
  - 58 bonding area (surrounding the central area)
  - 59 non-bonding area (e.g., pull tab, surrounding the bonding area 58)
- 70 liner assembly formed of 30 and 50
- 80 closure assembly formed of liner assembly 70 and cap 20

In the drawings, wherein various embodiments of the invention are shown, and wherein similar reference characters (in different 100 series) designate corresponding parts throughout the several views, a closure assembly 80 includes a closure cap 20, a primary liner 30 and a secondary liner 50. The closure cap 20 can be of any conventional plastic material used for molded closures, such as polypropylene or polyethylene. More particularly, the closure cap 20 includes a planar top wall 21 having a circular peripheral edge 21P, and a depending cylindrical skirt 22 extending from the circular edge 21P.

The closure assembly 80 is typically designed for use with any type of container 10 that is commonly used for storing and dispensing a product, such as a solid, liquid or paste product. In one embodiment, the product comprises a plurality of individual solid articles 5 where it is preferred to have controlled (restricted) egress of the given product articles, generally one or two at a time (such as a medicine tablet). Although a specific type of container is not required for use with the present closure assembly 80, it is contemplated that the container 10 will include a container neck 12, which may include external threading 16 designed to engage complimentary threading 26 on the inside surface 25 of the closure cap 20. The neck 12 terminates at an upper end in an annular rim 13, which defines the open container mouth 14. The opening created by the container mouth 14 into the container has a given diameter D1. The rim 13 has an inner diameter D1 and an outer diameter D5 (see FIGS. 4-5).

The primary liner 30 is a disc-shaped planar body having a bottom surface 33, a top surface 32 and a restricted product outlet orifice (aperture) 34 extending through the top and bottom surfaces and through all layers of the primary liner (as described below). The restricted product orifice 34 may comprise a single opening (aperture) 34 as in FIGS. 1-5, or multiple openings (apertures) 34A-34G as shown in FIG. 24. The restricted product orifice is of a size and shape based on the particular product and desired dispensing rate. In one example, the orifice is configured (of a size and shape) based on the dimensions of a specific individual product article 5 e.g., (to allow the passage of one or two individual solid product articles, without allowing a flow of more articles at one time while the container is tilted or turned upside down to dispense an article 5). In the embodiment shown in FIGS. 1-5, the restricted product orifice 34 is a single aperture that is circular and has a diameter D2 which is less than the diameter D1 of the container mouth, e.g., D2 is less than 50% of the diameter D1. The outer diameter D5 of the primary liner 30 is preferably equal to the outer diameter D5 of the container rim 13, in order to seal the open mouth of the container but not unduly interfere with applying and heat sealing the closure assembly to the container. In FIG. 24, the restricted product orifice 34' is multiple openings (e.g., 34A-34G) sized for example to dispense a product such as a spice, or other products that require multiple apertures to dispense.

Figure 4:
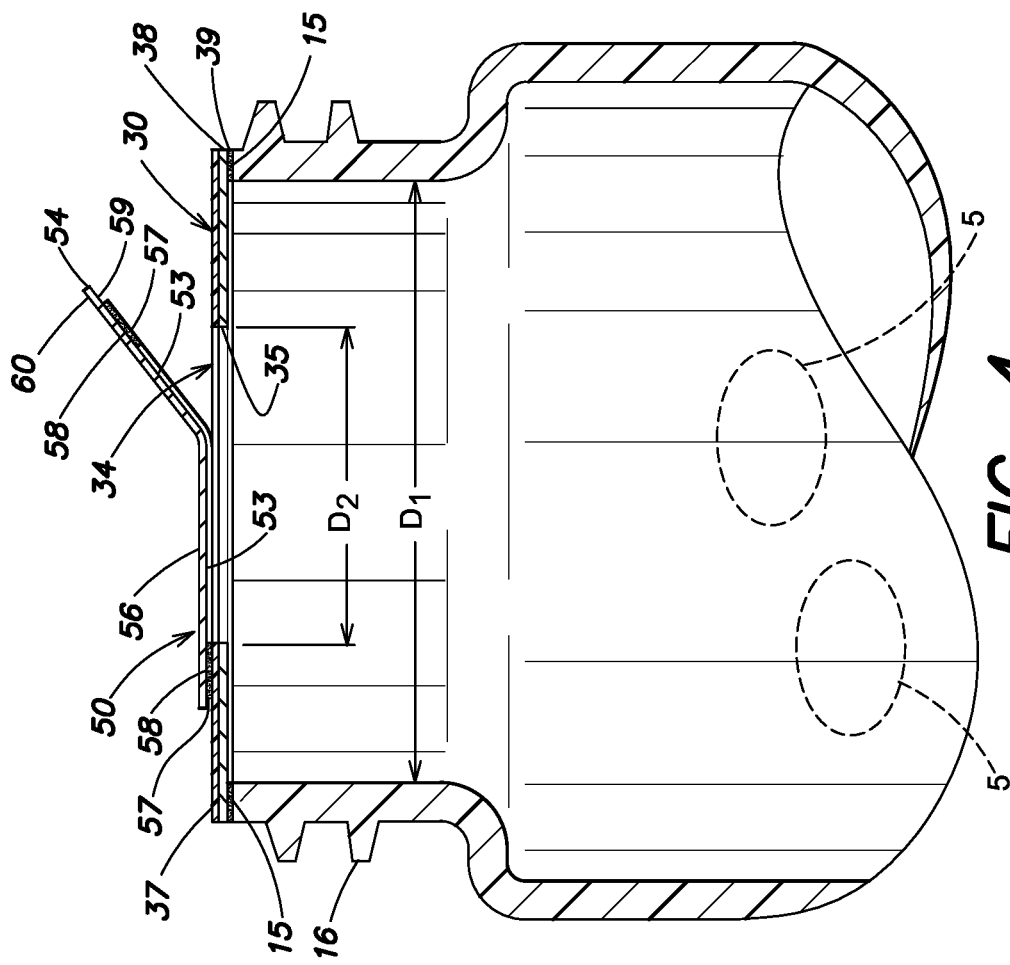

Referring to FIGS. 2-5, the secondary peelable liner 50 is a disc-shaped planar body having a bottom surface 53 and a top surface 52. The outer diameter D4 of the secondary liner is large enough to cover the product orifice 34, but is smaller than the diameter D1 of the mouth 32 and so as not to lie over the rim and interfere with insertion into the closure cap or inductive heat sealing of the primary liner to the rim. The secondary peelable liner 50 serves to protect the contents 5 of the container 10 as well as providing a tamper-indicating function. As shown in FIG. 4, the secondary peelable liner 50 must be removed by the consumer/user in order to gain access to the container contents (via the restricted product orifice 34 in the primary liner).

As shown most clearly in FIGS. 2-5, the primary liner 30 and secondary liner 50 also include on selected surfaces, bonding material which is used to bond the stacked layers in a predetermined fashion. On the bottom surface 33 of the primary liner 30 is a layer of permanent inductive heat-sealing material 39, such as a heat sealable polyester film or a heat sealable polyethylene film. The permanent bonding material 39 may be applied to cover substantially the entire bottom surface 33, or the permanent bonding material 39 be applied only along the outermost annular periphery 39P of the liner 30 that corresponds (is disposed adjacent) to the annular rim 13 of the container 10 in order that the sealing material adheres properly to the rim.

Suitable material for the permanent heat seal layer 39 includes heat sealable polyethylene terephthalate or polyolefin materials such as EVA, polyethylene, polypropylene, PVC, etc., depending on the container composition to be sealed and the parameters (composition and thickness) of the layer materials and inductive heating method applied.

As shown in FIGS. 2-5, there is a layer of temporary bonding material 57 which is selectively applied to the bottom surface 53 of the peelable secondary liner 50. This temporary bonding material 57 is of a type that creates a less aggressive bond than the material 39, such that the peelable liner 50 can be easily removed (peeled off) by the end user of the container to gain access to the container contents (via the restricted product orifice in the primary liner). The secondary liner has an outer diameter D4 (that is less than D1 and D5 for the reasons previously given) and includes the following three radially disposed portions: a) a central area 55 (of diameter D2) that lies over the restricted product orifice 34 and has no bonding material 57 (where it is not needed); b) an annular bonding area 58, surrounding the central area 55 and defined by inner diameter D2 and outer diameter D3, which includes the bonding material 57 for temporary attachment to the primary liner and for enclosing/sealing the area above the central orifice 34; and c) an annular peripheral non-bonded area 59 (defined by inner diameter D3 and outer diameter D4) disposed at the outer periphery of the secondary liner, this area 59 having no bonding material 57 so as to form an integral annular peripheral tab, enabling the user to inert a finger under the outer peripheral area 59 to engage and pull off the peelable secondary liner 50 from the primary liner 30.

The primary purpose of the peelable secondary liner 50 is to cover the restricted product orifice 34 of the primary liner 30 prior to dispensing. The peelable liner 50 can perform other secondary functions including, but not limited to, maintaining the freshness of the product by covering the restricted product orifice 34, acting as an indicator of tampering, and providing a surface for conveying text or graphical information to the user (e.g., concerning the product and/or how to remove the secondary liner and expose the restricted product orifice).

In various embodiments, the primary liner 50 and/or secondary liner 30 may include a layer of aluminum foil having a thickness from 0.0003 to 0.003 inch. The primary and/or secondary liners may further include bonding layers each having a thickness from 0.0005 to 0.0035 inch. The primary liner and/or secondary liner may include a layer for structural support or tear-resistance, such as a layer of PET film or polyolefin film.

In the embodiment of FIGS. 1-5, the primary liner 30 may comprise for example:
  A top layer 37 of PET film or polyolefin film;
  An intermediate layer 38 of aluminum (Al) foil; and
  A bottom layer 39 of permanent inductive heat-sealing material.

In the embodiment of FIGS. 1-5, the secondary liner may comprise for example:
  A top layer 56 of PET film, or Al foil, or PET film/polyolefin foam/Al foil, or paper;
  A bottom layer 57 of temporary bonding material.

The primary and secondary liners, once bonded by material 57, form a liner assembly 70, that can be placed (as an assembly) into a retainer portion 24 inside the closure cap 20. Optionally, a further liner component may be included in the liner assembly 70, disposed on the top surface of the secondary liner by a temporary adhesive and that will separate from the secondary liner and remain in the closure cap when the user opens the closure cap; this additional liner component that is retained inside the cap after the cap is first removed, aids in resealing of the cap onto the rim to further maintain the freshness of the container contents once the secondary peelable liner 50 has been removed.

As shown in FIGS. 2 and 3, the liner assembly 70 will be held up within the retainer portion 24 of the cap 20 such as through a frictional fit or by adhering it into the inner closure area 23 so that it does not become dislodged or lost during storage, transport or during the application process. To this end, the inner threads 26 of the closure cap 20 form an interference structure above which the liner assembly 70 can be mounted and removably secured. Further, it is contemplated that the integral tab (annular ring) formed by the nonbonding area 59 around the periphery of the secondary liner 50 does not interfere with the placement of the liner assembly in the cap (in contrast to tabs that extends beyond the periphery of the secondary liner and must be folded over the upper surface of the liner so as not to interfere with placement of the liner assembly in the cap and/or interfere with placement of the liner assembly on the rim of the container for proper heat sealing between the liner and rim. Since the liner assembly 70 fits within the retainer portion 24 of the closure, it can be transported as a unit, namely as a closure assembly 80, comprising 20, 30 and 50 together, to the bottler. The bottler can then apply the closure assembly onto the container quickly and easily.

Once the closure assembly 80 is applied onto the container 20, such as shown in FIG. 2, an available heat activation sealing method (e.g., heat seal header) can be applied to the closure in order to activate the heat seal layer 39 to permanently bond the primary liner 30 onto the container rim (and to optionally adhere the peelable secondary liner 50 onto the top surface 52 of the primary liner. To further increase the pressure engagement between the closure cap and the container rim during the inductive heat-sealing step, a sealing bead can be included on the inner surface of the top wall 21 of the cap 20.

FIG. 6

FIG. 6 illustrates one method of making and applying the liner assembly 70 and closure cap to a container 10. This method entails several steps as outlined herein, however the exact sequence of steps can be altered or redirected without departing from the scope of the present invention.

The method (400) embodiment of FIG. 6 includes steps of:

Starting with (step 401) a first roll comprising a multi-layer web of the primary liner layers, and a second roll comprising a multi-layer web of the secondary liner layers; next (step 402) unwind the first web and cut a plurality of restricted product orifices in the first web (for forming a plurality of respective primary liners, each having one such restricted product orifice) and unwind the second web and cut a plurality of individual secondary liners from the second web. Next (step 403), position each individual secondary liner over a different respective product orifice (on the first web) and then (step 404) heat stake each secondary liner to an area around the respective product orifice to form a third web comprising a plurality of liner assemblies. Rewind (step 405) the third web and send (step 406) to a closure/liner insertion site. At the insertion site, unwind the third web and die cut (step 407) a plurality of individual liner assemblies. Next (step 408), insert each liner assembly into a different closure cap to form a plurality of closure assemblies, and send the closure assemblies to a filling site. At the filling site, fill each container (step 409) with the product. Next (step 410), apply a closure assembly to each container neck and then (step 411) send each container with attached closure assembly under a heat-sealing head to bond the closure assembly to the rim. The heat-sealed containers are now ready for shipment (step 412) to the retailer of distributor, for ultimate sale to the customer/user.

The application of inductive heating to the closure assembly 80 (while attached to the container) activates the bonding properties of layer 39 whereby the primary layer becomes permanently secured to the annular rim of the container. The filled and sealed container/cap unit is now ready for packaging and transportation to the given distributor or retailer.

FIG. 7

FIG. 7 illustrates another method embodiment (500), similar to the method embodiment (400) of FIG. 6, but where the primary and secondary liners are unassembled (not bonded) when inserted into the closure cap (step 504).

FIGS. 8-12

FIGS. 8-12 show a second embodiment of two liner components (140, 160) and a closure cap (120) that are assembled to form a closure assembly (180), the two liner components comprising: a two-layer (166A-166B) secondary liner (160) having a restricted product orifice (165), the secondary liner configured to be permanently bonded (not peelable) to the primary liner; a three-layer (147A-147C)) primary liner (140) having a central area (144A) defined by a perforated edge (144P) that matches the diameter of the restricted product orifice (165), wherein the perforated edge assists a user in broaching the central area 144A of the primary liner thereby forming, together with the product orifice (165), a combined restricted product orifice (extending through both the primary and secondary liners) for dispensing product therethrough.

FIGS. 13-17

FIGS. 13-17 show a third embodiment of two liner components (240, 260) and a closure cap (220) that are assembled to form a closure assembly (280), similar to the second embodiment, the two liner components comprising: a permanently bonded (not peelable) four-layer (266A-266D) secondary liner (260) having a restricted product orifice (265); and a three-layer (247A-247C) primary liner (240) having a central area (244A) defined by perforated edge (244P) that matches the diameter of the product orifice (265), wherein the perforated edge assists a user in broaching the central area 244A of the primary liner thereby forming, together with the product orifice (265), a combined restricted product orifice (extending through both the primary and secondary liners) for dispensing product therethrough.

FIGS. 18-22

FIGS. 18-22 show a fourth embodiment of two liner components (330, 350) and a closure cap (320) that are assembled to form a closure assembly (380), the two liner components comprising: a bonded (not peelable) two-layer (356, 357) secondary liner (350); and a three-layer (337, 338, 339) primary liner (330) having a restricted product orifice (334), where the central area (355) of the secondary liner (350) that lies above the restricted product orifice (334) of the primary liner is broached by a user's finger or tool thereby forming, together with the product orifice (334), a combined restricted product orifice (extending through both the primary and secondary liners) for dispensing product therethrough.

VARIOUS EMBODIMENTS

In various embodiments, the primary liner has three or more layers, with a product orifice (or area to be broached) extending through all layers. The three layers of the primary liner may include, for example:

A top support layer (adjacent the bottom of the secondary liner) of non-heat seal material that does not melt during the induction heat sealing step, such as a solid PET film layer, a polyolefin foam layer, or a solid polyolefin film (such as high-density polyethylene HDPE that can be broached to expose the product orifice);

An intermediate layer of metal (for example aluminum foil) for inductively heating other layers during the induction heat sealing step, and providing a barrier to the environment (e.g., protecting the product from moisture and oxygen); and A bottom layer (adjacent the rim of the container) made of an induction heat seal material (that melts and bonds to the rim of the container during the assembled container/closure heat sealing step).

The product orifice (or area to be broached) can be in a central area or off-center and of any appropriate shape (circular, oval, etc.) as required for a given application/product to dispense.

The secondary liner is also multi-layer, having two or more layers, of foil or non-foil based materials, such as:

A top layer of PET film, or AL foil, or paper, or the top layer having multiple layers such as PET film/polyolefin foam/Al foil layers; and A bottom layer (adjacent the top of the primary liner) of bonding material (to bond to the top surface of the primary liner, either before (e.g., by heat staking) or during the inductive heat-sealing step. The secondary liner structure can be die-cut in a desired shape, such round, oval, leaf, or any shape, and one or more layers can be less than the cross-sectional area of the secondary liner (e.g., the heat staking material can be limited to less than the maximum cross-sectional area). In one embodiment, the bottom layer/surface of the secondary liner includes a bonding area, for bonding to the primary liner, and a peripheral non-bonding area for a consumer/user to grab and peel off the secondary liner (for an ease of removal of the secondary liner from the primary liner). As an alternative (to a releasable/peelable bond with the primary liner), the secondary liner can be permanently fused or weld bonded to the primary liner by selection of an appropriate bonding material, where a package/application calls for a consumer/user to broach (break through or pierce the area of the secondary liner that lies over the product orifice) to access the product through the product outlet orifice of the primary liner.

When heat staking (temporary heat bonding) of the secondary liner to the primary liner is desired, the secondary liner can be smaller in size (cross-sectional area), for example of a smaller diameter, than the primary liner. In other embodiments, the secondary and primary liners can be the same size.

After insertion of the primary liner and the secondary liner into the closure forming a closure assembly, the resulting closure assembly is applied to the product filled container and passed through an induction heat sealing head whereupon the primary liner is inductively heat-sealed to form a permanent/destructive type bond to the container rim by the means of induction heat sealing.

In one embodiment, the primary liner (with product outlet orifice) and the secondary liner are supplied to the closure manufacturer as a two separate (non-assembled) liners that the closure manufacturer then die cuts and inserts into the closure either together or one after another such that the primary liner faces the product (contacts the container rim to form a permanent seal to the container rim as a result of induction heat sealing, and the bottom seal side of the secondary liner contacts the top of the primary liner and heat tacks/bonds to the top of the primary liner forming a temporary seal covering the product orifice of the primary liner as a result of induction heat sealing at the product fill line. The non-heat seal top side of the secondary liner is in contact with the inside (inner) top wall of the closure.

As a result of the induction heat sealing process (with the closure assembly applied to the product-filled container), the primary liner with the product outlet orifice heat permanently bonds to the container land and the secondary liner heat tacks as peelable or permanently fused (as necessary for the application) to form a cover to the product outlet orifice. A consumer/user of the package can peel off the secondary liner or broach the secondary liner (at the product outlet orifice) to dispense the product. In various embodiments, one or both of the two liners can be a non-foil multilayer structure if/as desired for a given application.

When the primary and secondary liners are supplied as two separate liners for the closure insertion as described above, another method of bonding the secondary liner to the primary liner is for these two liners to be assembled by the means of a heated mandrel type tooling to bond the two liners at the closure die-cut and insertion operation (instead of during the induction heat sealing step).

In various embodiments, the liner includes a lowermost induction heat-sealable layer, an inductive heating layer (e.g., a metal film layer that heats resistively during the induction heat sealing operation) above the lowermost heat-sealable layer, and one or more layers of reinforcing (support) materials for enhancing the mechanical strength of the liner (e.g., enabling the liner to be punched, inserted into a closure, pushed down over the mouth of the container by the closure (e.g. screw cap), induction heat sealed to the container rim, and the upper (secondar) liner subsequently pulled from the container rim without rupturing).

As used herein, a layer or sheet of inductive heating material is any material which heats resistively when it conveys an induced electrical current. Typically, the inductive heating layer is a metal foil layer, such as aluminum foil.

The induction heat sealable (lowermost) layer can be made from any polymeric material that will soften and seal to the rim of a container. The heat sealable layer is typically made from polyethylene terephthalate or a material selected from the group comprising polyethylene, polypropylene and copolymers and blends thereof; such materials may be copolymers with ethylene such as with vinyl acetate, methyl acrylate, ethyl acrylate, or with a variety of alpha olefins such as butene, hexene, or octene. The inductive heating layer and the heat sealable layer may be joined by means of a binder (e.g., a two-component isocyanate-hydroxyl adhesive). In another embodiment, the inductive heating layer may be coated with a heat sealable material.

In various embodiments the liner may include one or more layers of polyolefin material. The polyolefin may be one or more of polyethylene, polypropylene, polyethylene vinyl acetate (EVA), polyethylene-methyl acrylate (EMA), and polyethylene-ethyl acrylate (EEA). The polyolefin material may comprise a single polymer, a copolymer, or blend. Preferably the polyolefin layers are formed from at least one of an ethylene-based polymer and a propylene-based polymer. The ethylene-based polymer may be an ethylene-alpha olefin copolymer, and the propylene-based polymer may be a propylene-alpha olefin copolymer.

Additional layers of the liner may include a reinforcing layer, such as a bi-axially oriented polyester film, for example polyethylene terephthalate (PET). The layer may have a thickness of for example between 4 and 100 micrometers. The overall liner thickness may typically range between 100 and 600 micrometers.

While various preferred embodiments of the invention have been shown and described, this is not intended to limit the invention, but rather it is intended to cover all modifications and alternative constructions that may fall within the scope of the invention as defined in the appended claims.

The invention claimed is:

1. An induction heat-sealable closure assembly having a restricted product orifice, the closure assembly comprising: two liner components (30, 50) and a closure cap (20) that are assembled to form a closure assembly (80), the two liner components comprising: a multi-layer primary liner (30) having a heat seal layer (39) configured for inductive heat sealing to a rim surrounding an open mouth of a container, the primary liner having a restricted product orifice (34) extending therethrough that is smaller than the open mouth of the container and that is sized to dispense product therethrough; a multi-layer secondary liner (50) smaller in diameter than both the rim and the primary liner so as not to interfere with insertion of the primary and secondary liners into the container closure cap (20) and not to interfere with induction heat seal bonding of the primary liner (30) to the rim (13), the primary and secondary liners (30,50) being bonded by material (57) to form a liner assembly (70) that is placed into a retainer portion (24) inside the closure cap (20) to form the closure assembly (80) and the closure assembly (80) is applied onto the container (20) in order to activate the heat seal layer (39) on the primary liner to permanently bond the primary liner onto the container rim (13), the secondary liner having a central portion (55) covering the restricted product orifice (of the primary liner), a peelable bonded annular portion (58) surrounding the central portion that is temporarily bonded to the primary liner to seal the enclosed product orifice (34); and a further annular portion (59) surrounding the bonded portion forming an unbonded integral pull tab to assist a user in peeling the secondary liner from the primary liner to expose the restricted product orifice (34).

2. An induction heat-sealable closure assembly having a restricted product orifice, the closure assembly comprising: two liner components (140, 160; 240, 260) and a closure cap (120; 220) that are assembled to form a closure assembly (180; 280), the two liner components comprising: a multi-layer primary liner (140; 240) configured for inductive heat sealing to a rim surrounding an open mouth of a container, a multi-layer secondary liner (160; 260) having a restricted product orifice (165; 265) extending therethrough that is smaller than the open mouth of the container and that is sized to dispense product therethrough, the secondary liner configured to be permanently bonded to the primary liner; the primary liner (140; 240) having a central area (144A; 244A) defined by a perforated edge (144P; 244P) that matches the diameter of the restricted product orifice (165; 265), wherein the perforated edge assists a user in broaching the central area (144A; 244A) of the primary liner thereby forming, together with the product orifice (165; 265), a combined restricted product orifice extending through both the primary and secondary liners for dispensing product therethrough.

3. An induction heat-sealable closure assembly having a restricted product orifice, the closure assembly comprising: two liner components (330, 350) and a closure cap (320) that are assembled to form a closure assembly (380), the two liner components comprising: a multi-layer primary liner (330) configured for inductive heat sealing to a rim surrounding an open mouth of a container, the primary liner having a restricted product orifice (334) extending therethrough that is smaller than the open mouth of the container and that is sized to dispense product therethrough;

a multi-layer secondary liner (350) permanently bonded to the top of primary liner, the secondary liner (350) having a central area (355) disposed above the restricted product orifice (334) of the primary liner and configured to be broached by a user's finger or tool thereby forming, together with the restricted product orifice (334), a combined restricted product orifice extending through both the primary and secondary liners for dispensing product therethrough.

4. The closure assembly of claim 1, wherein the primary liner comprises at least three layers.

5. The closure assembly of claim 1, wherein the secondary liner comprises at least two layers.

6. The closure assembly of claim 1, wherein the primary liner and/or secondary liner comprise one or more metal layers.

7. The closure assembly of claim 1, wherein the primary liner and/or secondary liner comprise one or more layers of PET and/or polyolefin film.

8. The closure assembly of claim 2, further comprising a peelable liner (500) that is temporarily attached to the top surface of the secondary liner (160) to cover the restricted product orifice (165).

9. The closure assembly of claim 1, wherein the restricted product orifice (34) comprises a single opening.

10. The closure assembly of claim 1, wherein the restricted product orifice (34) comprises multiple openings.

11. A method of making the closure assembly of claim 1, wherein the primary liner and secondary liner are inserted into the closure cap prior to induction heat sealing of the primary liner to the container rim.

12. A method of making the closure assembly of claim 1, wherein the primary liner and secondary liner are bonded together to form a liner assembly, and the liner assembly is inserted into the closure cap for induction heat sealing of the primary liner to the container rim.

13. A closure liner assembly configured for sealing an annular rim defining an open mouth of a product container, the closure liner assembly comprising:
- a primary liner (30; 330) of planar configuration with opposing top and bottom surfaces and an annular periphery dimensioned to span the open mouth of the container, the primary liner having multiple layers in a direction transverse to a plane defining the open mouth of the container, the multiple layers including a lowermost heat induction heat seal layer forming the bottom surface for bonding to the rim of the container, an uppermost polymer layer forming the top surface, and an intermediate metal foil layer, the primary liner having a restricted product orifice (34; 334; 34') with one or multiple openings and having a periphery smaller than the open mouth and extending in the transverse direction through the multiple layers of the primary liner;
- a secondary liner (50; 350) of planar configuration disposed adjacent the top surface of the primary liner and having a central portion dimensioned to cover the restricted product orifice and an outer peripheral portion that is smaller than the periphery of the primary liner,
- a cap (20; 320) having a top wall and a depending annular skirt defining an inner closure area configured to releasably engage with the neck of the container and including a retainer portion for temporarily retaining the primary and secondary liners within the inner closure area, wherein said primary liner and secondary liner are positionable within the retainer portion of the cap to form a closure liner assembly, and the closure liner assembly is positionable to seal the open mouth of the product container by induction heat sealing of the lowermost heat seal layer to the rim, wherein upon removal of the cap from the container, the secondary liner remains bonded to the top surface of the primary liner as a tamper evident closure of the restricted product orifice, and the secondary liner is configured to be peeled from the top surface of the primary liner to open the restricted product orifice to enable removal of the product, or the central portion of the secondary liner over the restricted product orifice is configured to be broached to open the product orifice to enable removal of the product.

14. The closure assembly of claim 2, wherein:
the primary liner (140; 240) is of planar configuration with opposing top and bottom surfaces and an annular periphery dimensioned to span the open mouth of the container, the primary liner having multiple layers in a direction transverse to a plane defining the open mouth of the container, the multiple layers including a lowermost heat induction heat seal layer forming the bottom surface for bonding to the rim of the container, an uppermost polymer layer forming the top surface, and an intermediate metal foil layer, the secondary liner (160; 260) is of planar configuration disposed adjacent the top surface of the primary liner, the closure cap having a top wall and a depending annular skirt defining an inner closure area configured to releasably engage with a neck of the container and including a retainer portion for temporarily retaining the primary and secondary liners within the inner closure area, wherein said primary liner and secondary liner are positionable within the retainer portion of the cap to form a closure liner assembly, and the closure liner assembly is positionable to seal the open mouth of the product container by induction heat sealing of the lowermost heat seal layer to the rim, wherein upon removal of the closure cap from the container, the secondary liner remains bonded to the top surface of the primary liner as a tamper evident closure of the restricted product orifice.

15. The closure liner assembly of claim 14, wherein the primary liner comprises at least three layers.

16. The closure liner assembly of any of claim 14, wherein the secondary liner comprises at least two layers.

17. The closure liner assembly of any of claim 14, wherein the primary liner and/or secondary liner comprise one or more metal layers.

18. The closure liner assembly of any of claim 14, wherein the primary liner and/or secondary liner comprise one or more layers of PET and/or polyolefin film.

19. The closure liner assembly of any of claim 14, further comprising a peelable liner (500) that is temporarily attached to the top surface of the secondary liner (160) to cover the restricted product orifice (165).

\* \* \* \* \*